United States Patent
Yamasaki

(10) Patent No.: US 7,079,324 B2
(45) Date of Patent: Jul. 18, 2006

(54) ZOOM LENS AND IMAGE PROJECTION APPARATUS INCLUDING THE SAME

(75) Inventor: Shinji Yamasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/218,828

(22) Filed: Sep. 1, 2005

(65) Prior Publication Data

US 2006/0061872 A1 Mar. 23, 2006

(30) Foreign Application Priority Data

Sep. 17, 2004 (JP) ............................. 2004-271577

(51) Int. Cl.
G02B 15/14 (2006.01)

(52) U.S. Cl. ...................... 359/680; 359/681; 359/682; 359/683; 359/684; 359/686; 359/689; 359/691; 359/713; 359/714; 359/715; 359/716; 359/717; 359/737; 359/749; 359/761; 359/770; 359/781

(58) Field of Classification Search ................ 359/676, 359/680–684, 686, 689, 691, 713–717, 737, 359/749–753, 761, 770, 781
See application file for complete search history.

(56) References Cited

U.S. PATENT DOCUMENTS

| | | | | |
|---|---|---|---|---|
| 4,818,082 A * | 4/1989 | Kreitzer ...................... 359/682 |
| 5,253,113 A * | 10/1993 | Sekita et al. ................. 359/680 |
| 5,325,236 A * | 6/1994 | Tanaka ........................ 359/689 |
| 5,668,668 A * | 9/1997 | Shibayama et al. ......... 359/683 |
| 5,721,642 A * | 2/1998 | Shibayama et al. ......... 359/686 |
| 5,798,871 A * | 8/1998 | Shibayama et al. ......... 359/684 |
| 5,999,329 A * | 12/1999 | Ohtake ........................ 359/686 |
| 6,075,653 A * | 6/2000 | Narimatsu et al. .......... 359/686 |
| 6,163,410 A * | 12/2000 | Nagaoka ..................... 359/680 |
| 6,317,270 B1 * | 11/2001 | Nagaoka ...................... 359/684 |
| 6,496,310 B1 * | 12/2002 | Fujimoto ..................... 359/680 |
| 6,515,803 B1 * | 2/2003 | Hirose ......................... 359/682 |
| 6,587,279 B1 * | 7/2003 | Narimatsu et al. .......... 359/683 |
| 6,606,201 B1 * | 8/2003 | Hirose ......................... 359/686 |
| 6,636,361 B1 * | 10/2003 | Wada .......................... 359/680 |
| 6,728,482 B1 * | 4/2004 | Hagimori et al. ........... 359/689 |
| 6,785,055 B1 * | 8/2004 | Nishikawa et al. .......... 359/681 |
| 6,816,320 B1 * | 11/2004 | Wada .......................... 359/683 |
| 6,995,923 B1 * | 2/2006 | Noda .......................... 359/689 |
| 2001/0050818 A1 | 12/2001 | Wada |

(Continued)

FOREIGN PATENT DOCUMENTS

JP 2001-100100 A 4/2001

(Continued)

*Primary Examiner*—Evelyn A. Lester
(74) *Attorney, Agent, or Firm*—Canon USA, Inc., Intellectual Property Division

(57) ABSTRACT

A zoom lens includes a plurality of lens groups including a first lens group arranged on the foremost side and having negative optical power. Zooming is performed by moving at least one of the plurality of lens groups along a direction parallel to an optical axis of the zoom lens. The first lens group is fixed during the zooming. A first lens arranged on the foremost side, of the first lens group has negative refractive power. When an Abbe constant and a partial dispersion of a material configuring the first lens are respectively represented by νdn and θg,Fn, a focal distance of the first lens group is represented by f1, and an air-equivalent back focus upon focusing on an infinity object is represented by bf, the following conditions are satisfied:

$\nu dn < 32$, $0.008 < \theta g, Fn - (0.644 - 0.00168 \times \nu dn) < 0.040$, and $|f1/bf| < 0.9$.

18 Claims, 12 Drawing Sheets

U.S. PATENT DOCUMENTS

| | | |
|---|---|---|
| 2003/0117716 A1 | 6/2003 | Sekita |
| 2003/0197949 A1* | 10/2003 | Eguchi .................. 359/680 |
| 2003/0206352 A1* | 11/2003 | Mihara et al. ............ 359/684 |
| 2005/0036206 A1* | 2/2005 | Wada .................... 359/676 |
| 2005/0046961 A1* | 3/2005 | Saori .................... 359/680 |
| 2005/0046963 A1* | 3/2005 | Adachi .................. 359/689 |
| 2005/0057819 A1* | 3/2005 | Eguchi .................. 359/680 |
| 2005/0157402 A1* | 7/2005 | Rodriguez et al. ........ 359/680 |

FOREIGN PATENT DOCUMENTS

| | | |
|---|---|---|
| JP | 2001-108900 A | 4/2001 |
| JP | 2001-235679 A | 8/2001 |
| JP | 2002-131636 A | 5/2002 |
| JP | 2003-050352 A | 2/2003 |
| JP | 2004-004964 A | 1/2004 |
| JP | 2004-138678 A | 5/2004 |

* cited by examiner

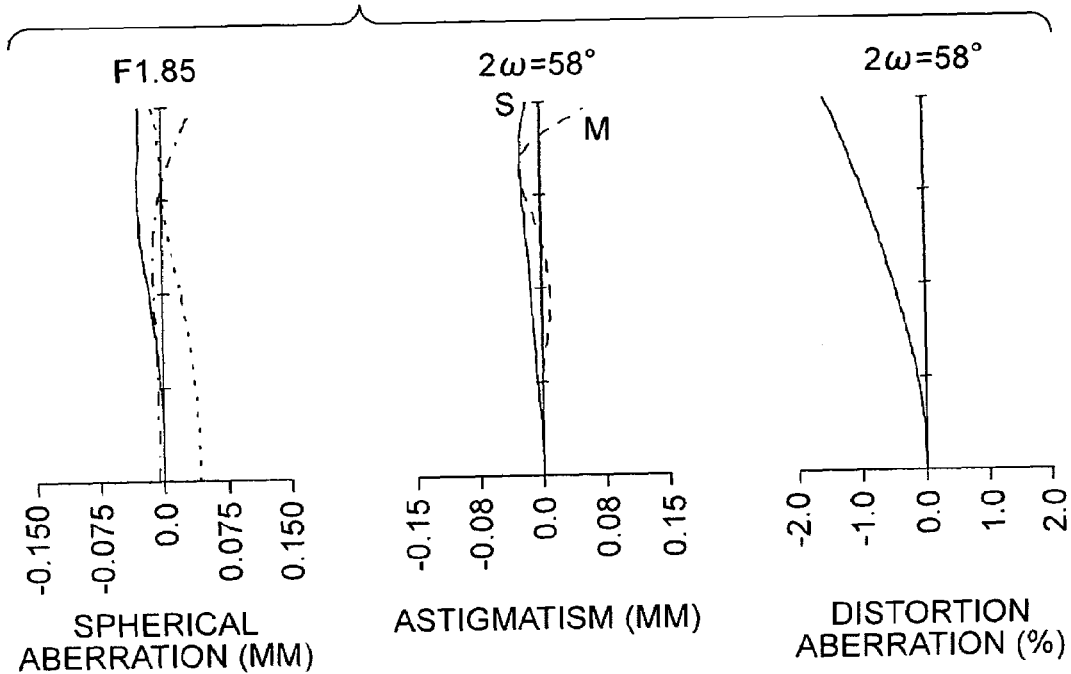
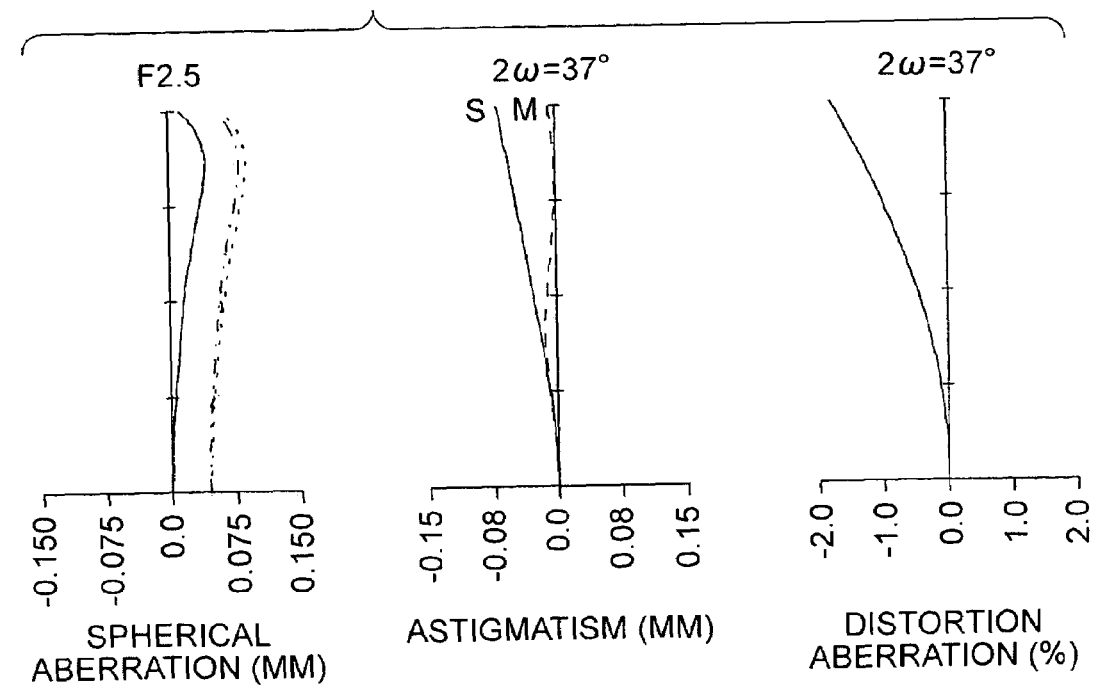

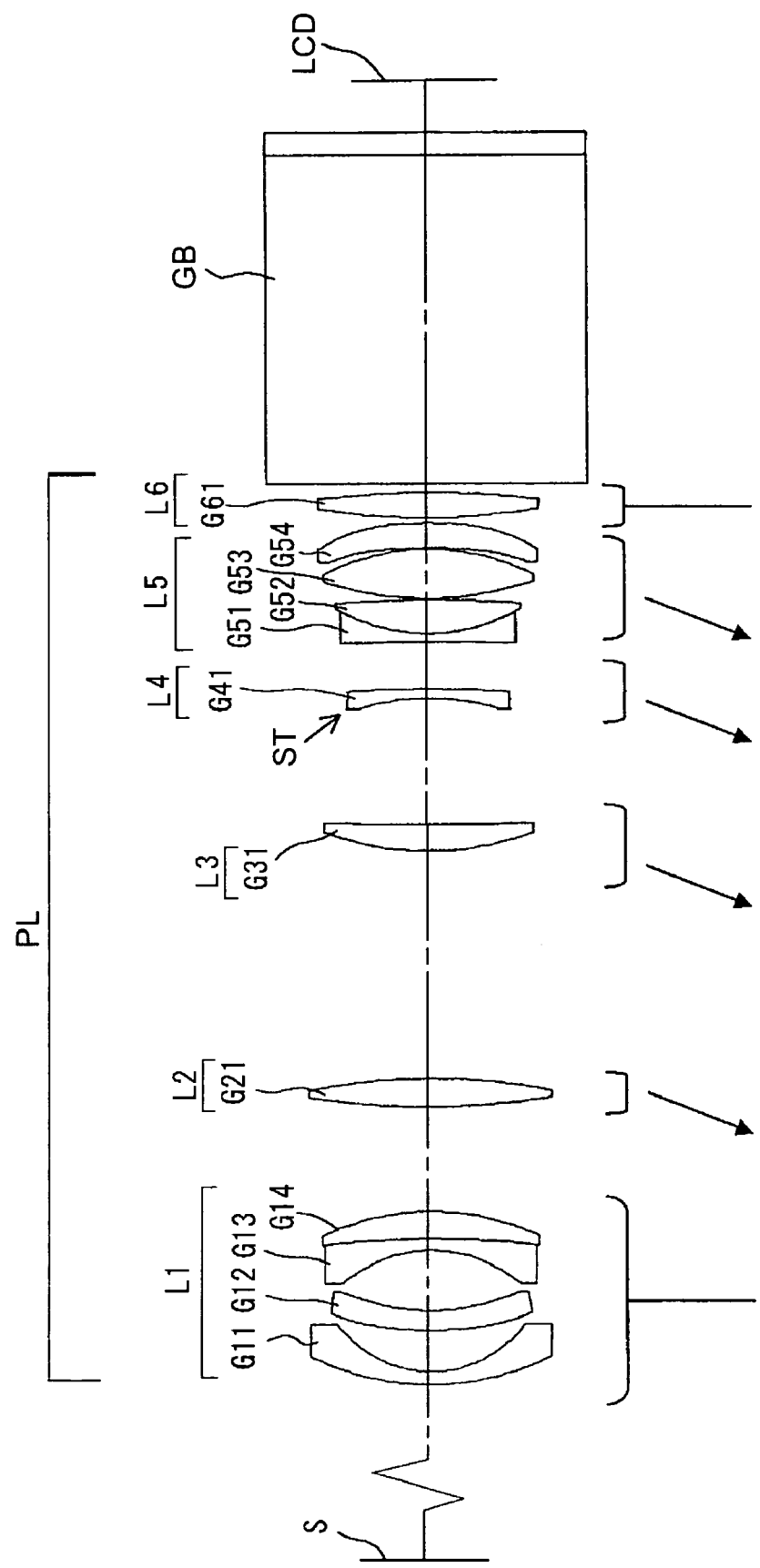

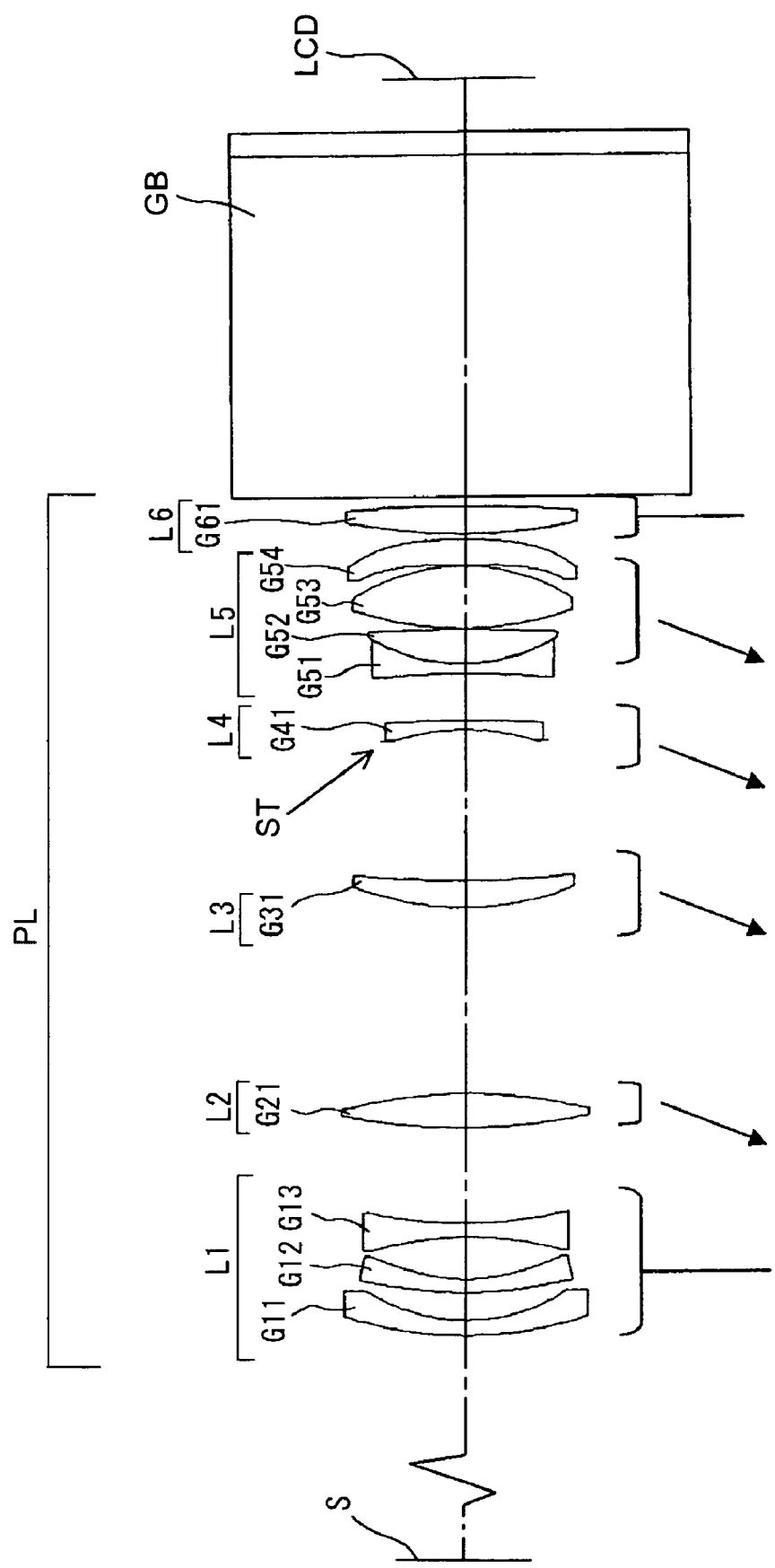

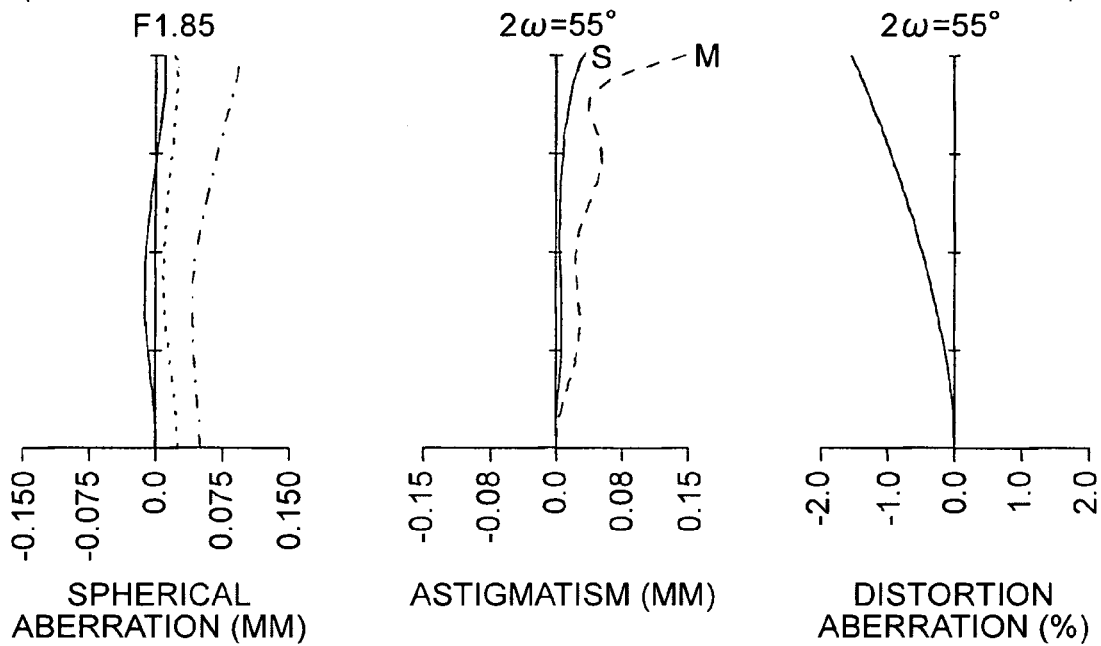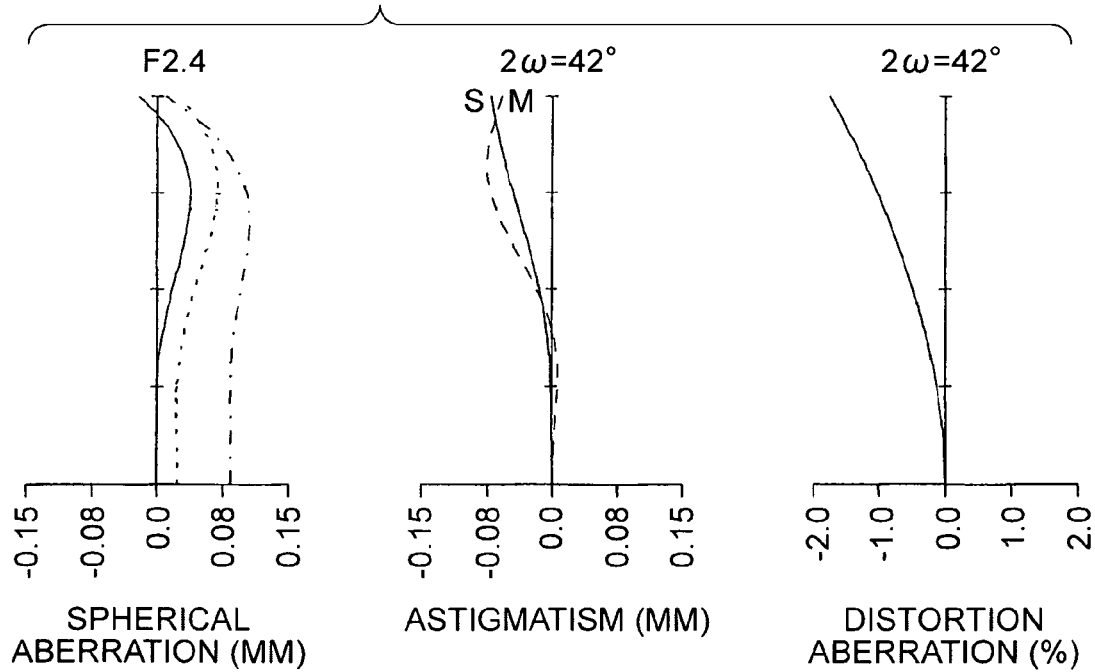

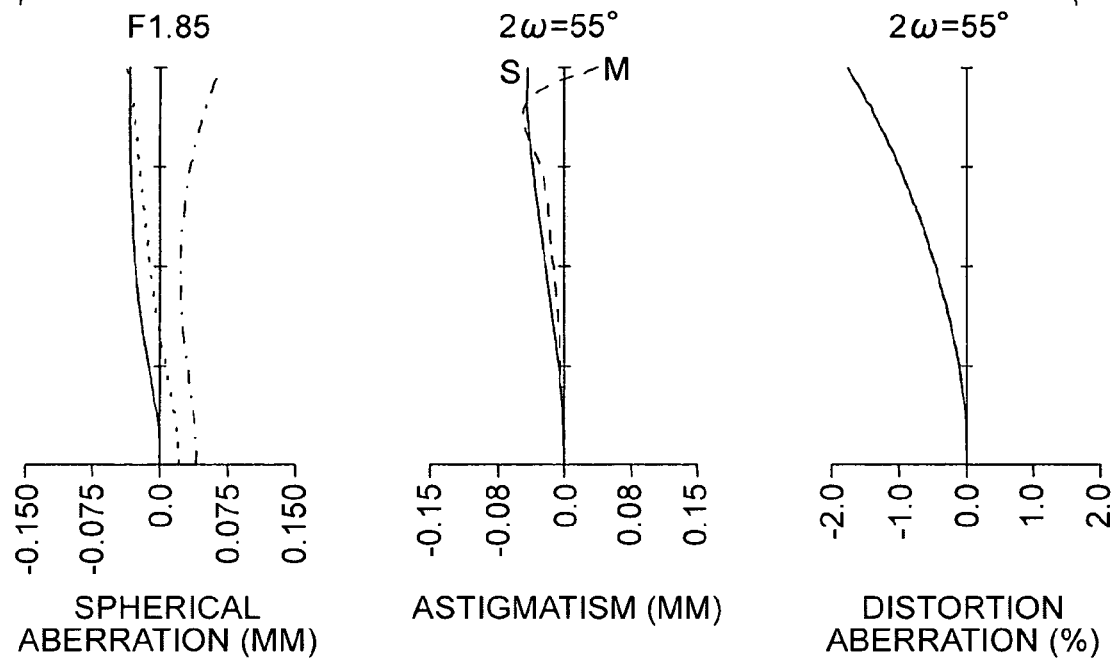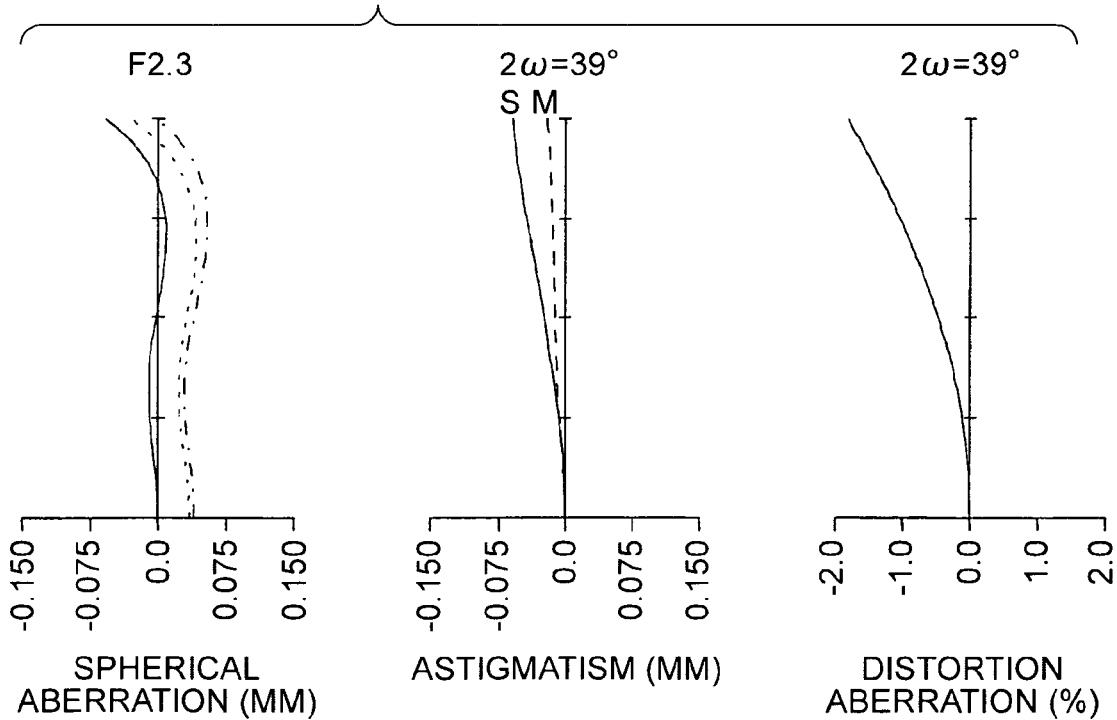

IN THE CASE OF APPLYING PRESENT INVENTION
TO LIQUID CRYSTAL PROJECTOR

ZOOM LENS AND IMAGE PROJECTION APPARATUS INCLUDING THE SAME

BACKGROUND OF THE INVENTION

1. Field of the Invention

The present invention relates to a zoom lens and an image projection apparatus including the same, suitable for, for example, a liquid crystal projector having a long back focus and maintaining good pupil consistency with a lighting system.

2. Description of the Related Art

Hitherto, various kinds of liquid crystal projectors (image projection apparatuses), each including a display device such as a liquid crystal display and projecting an image formed in the display device onto a screen, have been proposed.

In particular, the liquid crystal projector is in widespread use for a conference and a home theater, as an apparatus capable of projecting an image outputted from a personal computer or the like onto a large screen. A projection lens for use in the liquid crystal projector is requested to have, for example, the following features.

(a) In a three-panel color liquid-crystal projector including three liquid crystal displays, light emitted from a white light source is generally separated into red, green and blue colors by a color-separation optical system and introduced into the corresponding liquid crystal displays. Three kinds of light emitted from the respective liquid crystal displays are synthesized by a color-synthesis optical system and incident on a projection lens.

Due to its configuration, a space having a prism and the like arranged therein, for synthesizing the three kinds of color light passing through the liquid crystal displays, must be provided between the liquid crystal displays and the projection lens, thereby causing the projection lens to have a certain length of back focus. In addition, use of a reflective liquid-crystal display, i.e. use of a liquid crystal on silicon (LCOS) as the liquid crystal display causes the projection lens to have a longer back focus than upon use of a transmissive liquid crystal display.

(b) When the angle of a light flux emitted from the liquid crystal display and incident on the color-synthesis optical system is changed, the spectral transmittance of the color-synthesis optical system is accordingly changed. As a result, a brightness of each color of the projected image is changed in accordance with the angle of view, thereby causing an image hard to be viewed. In order to reduce the influence of the angle dependency, the projection lens must be a so-called telecentric optical system in which a pupil close to the liquid crystal display (a reduction conjugate surface) lies substantially at infinity.

(c) When pictures (images) of the three color liquid-crystal displays are synthesized and projected onto a screen, pixels of the respective colors must be overlaid one another across the overall screen so as prevent a loss of a resolution sensation caused by phenomena, for example, seeing two of a character.

To achieve this, a color drift (a chromatic aberration of magnification) generated in the projection lens must be satisfactorily compensated for in the visible light zone.

(d) A distortion aberration must be satisfactorily compensated for so as to prevent the projected image from being hard to be viewed because of distortion.

(e) The projection lens must have a small F-number (hereinafter, referred to as an Fno) and be a bright one so as to efficiently take in light emitted from the light source.

(f) Recently, needs for a higher brightness and a high resolution of a projector are present, and at the same time, a projector having small liquid crystal panels installed therein is required to have a reduced size and weight for giving greater importance to its portability and mobility. At the same time, taking account of a use environment of such a small-sized projection apparatus, the projection lens must be a large magnification-varying zoom lens with which an image is projected onto a large screen with a shorter projection distance and the size of a projection screen is easily adjusted.

The liquid crystal projector-use projection lens required to have a long back focus and a variety of high optical properties as described above sometimes has an aspherical lens (a lens having an aspherical surface) incorporated therein as an effective mechanism for satisfactorily compensating various aberrations without increasing the number of lenses.

Also, when focusing attention on easy workability and productability, the aspherical lens should be composed of a plastic material.

Hitherto, a variety of liquid crystal projector-use projection lenses are proposed (see Japanese Patent Laid-Open Nos. 2004-004964, 2001-100100, and 2002-131636).

While Japanese Patent Laid-Open No. 2004-004964 discloses an optical system aiming at a reduced size and a low cost, the system is directed to use in a transmissive liquid-crystal projector and, in addition to a limit for achieving a wider angle and a larger magnification, has an excessively short back focus when used in a reflective liquid-crystal projector.

While Japanese Patent Laid-Open No. 2001-100100 discloses an optical system having a reduced size and inhibiting various aberrations generated due to its magnification of varying, in addition to a limit for achieving a larger magnification, the system has an excessively small back focus when used in the reflective liquid-crystal projector.

While Japanese Patent Laid-Open No. 2002-131636 discloses an optical system having a long back focus, taking account of use for in the reflective liquid-crystal projector while keeping a wide angle of view, the system has a large Fno and includes a single focal-point lens.

Also, as a projection lens for use in the liquid crystal projector, US Published Application. 2001050818 discloses a six-group zoom lens configured by six lens groups as a whole, having a structure in which first to sixth lens groups respectively having negative, positive, positive, negative, positive (or negative), and positive refractive power are arranged in order from its magnification conjugate side (from its front side), and performing zooming by appropriately moving a predetermined lens groups of these lens groups.

With a structure in which the first and sixth lens groups are fixed and all of the inside second to fifth lens groups are moved towards the reduction conjugate side (the rear side of the zoom lens) upon zooming from its wide angle end to telephoto end, the above six-group zoom lens maintains the overall length constant at the time of zooming and serves as a telecentric zoom lens towards the reduction conjugate side while reducing the distortion aberration and the chromatic aberration upon zooming.

Other than the above-described lenses, as a projection lens for use in the known liquid crystal projector, Japanese Patent Laid-Open No. 2001-108900 discloses a six-group zoom lens configured by six lens groups as a whole, having a structure in which first to sixth lens groups respectively having negative, positive, positive, negative, positive, and positive refractive power are arranged in order from its magnification conjugate side (from its front side), and performing zooming by appropriately moving a predetermined lens groups of these lens groups.

With a structure in which the first, fourth, and sixth lens groups are fixed and the inside second, third, and fifth lens groups are moved upon magnification of varying from its wide angle end to telephoto end, the six-group zoom lens maintains the overall length constant and serves as a telecentric zoom lens on the reduction conjugate side while inhibiting variations in various aberrations including the chromatic aberration during magnification of varying.

Also, as a zoom lens for use in the liquid crystal projector, US Published Application. 2003117716 discloses a five-group zoom lens having a structure in which, in order from its front to rear sides, five lens groups respectively having negative, positive, negative, positive, and positive refractive power, and performing zooming by moving a plurality of the lens groups of these lens groups.

Also, while a zoom lens disclosed in Japanese Patent Laid-Open No. 2004-138678 has an optical system having a relatively long back focus, its Fno at its wide angle end is large on the order of 2.3 or 2.4, in other words, it serves as a dark zoom lens. In addition, with a large number of glass lenses, the zoom lens is required to improve its cost and weight.

In conjunction with achieving further miniaturization of the liquid crystal projector, presently, achievement of its short-range projection, that is, its wider angle of view, which contributes especially to a home-theater-use projector as a great advantage is strongly requested.

Also, in order to achieve a higher brightness of a projected picture, the projection lens is required to be bright and have a large aperture ratio.

In general, when the projection lens is made so as to achieve a wider angle of view while maintaining a long back focus, its lens group closest to the magnification side has larger refractive power.

Also, in order to achieve a telecentric zoom lens on the reduction conjugate side, the overall lens group arranged from its aperture to the reduction conjugate side has larger positive refractive power, and the overall lens system has a retrofocus refractive-power arrangement. Hence, an asymmetry of the lens system increases, resulting in difficulty in compensating for especially distortion aberration, chromatic aberration of magnification, and the like.

In addition, a curvature of field increases without minimizing the Petzval sum in accordance with a wider angle of view, resulting in difficulty in compensating for this phenomenon.

SUMMARY OF THE INVENTION

In accordance with a first aspect of the present invention, a zoom lens includes a plurality of lens groups including a first lens group arranged on the foremost side and having negative optical power. Zooming is performed by moving at least one of the plurality of lens groups along a direction parallel to an optical axis of the zoom lens. The first lens group is fixed during the zooming. A first lens arranged on the foremost side, of the first lens group has negative refractive power. When an Abbe constant and a partial dispersion of a material configuring the first lens are respectively represented by νdn and θg,Fn, a focal distance of the first lens group is represented by f1, and an air-equivalent back focus upon focusing on an infinity object is represented by bf, the following conditions are satisfied:

$$\nu dn < 32,$$

$$0.008 < \theta g, Fn - (0.644 - 0.00168 \times \nu dn) < 0.040, \text{ and}$$

$$|f1/bf| < 0.9.$$

In accordance with a second aspect of the present invention, a zoom lens includes a plurality of lens groups including a first lens group arranged on the foremost side, having negative optical power. Zooming is performed by moving at least one of the plurality of lens groups along a direction parallel to an optical axis of the zoom lens. A rearmost lens group of the plurality of lens groups is fixed during the zooming. A first lens arranged on the foremost side, of the first lens group has negative refractive power. When an Abbe constant and a partial dispersion of a material configuring the first lens are respectively represented by νdn and θg,Fn; a focal distance of the first lens group is represented by f1; and an air-equivalent back focus upon focusing on an infinity object located at an infinity distance from the zoom lens is represented by bf (in other words, bf represents an air-equivalent value of a back focus length of the zoom lens when the zoom lens is focused at the infinity, that is, of the length between the lens surface arranged closest to the reduction side and the reduction conjugate position, the following conditions are satisfied:

$$\nu dn < 32,$$

$$0.008 < \theta g, Fn - (0.644 - 0.00168 \times \nu dn) < 0.040, \text{ and}$$

$$|f1/bf| < 0.9.$$

In accordance with a third aspect of the present invention, a zoom lens includes five or six lens groups including a first lens group arranged on the foremost side and having negative refractive power. Upon zooming, the first lens group and a rearmost lens group are fixed and a plurality of the lens groups is movable. Negative and positive lenses Ln and Lp are respectively arranged on the foremost side and closest to an image. When an Abbe constant and a partial dispersion of a material configuring the negative lens Ln are respectively represented by νdn and θg,Fn and an Abbe constant and a partial dispersion of a material configuring the positive lens Lp are respectively represented by νdp and θg,Fp, and when a focal distance of the first lens group is defined f1 and an air-equivalent back focus is represented by bf, the following conditions are satisfied:

$$\nu dn < 32,$$

$$0.008 < \theta g, Fn - (0.644 - 0.00168 \times \nu dn) < 0.040,$$

$$|f1/bf| < 0.9,$$

$$\nu dp > 63, \text{ and}$$

$$-0.005 < \theta g, Fp - (0.644 - 0.00168 \times \nu dp) < 0.045.$$

In accordance with a fourth aspect of the present invention, an image projection apparatus includes a display unit forming an original image; and the zoom lenses according to the first aspect of the present invention, projecting the original image formed by the display unit onto a projection screen.

Further features of the present invention will become apparent from the following description of exemplary embodiments with reference to the attached drawings.

BRIEF DESCRIPTION OF THE DRAWINGS

FIGS. 2A and 2B illustrates aberration diagrams of a zoom lens according to Numerical Example 1.

FIG. 5 is a schematic view of a major part of an image projection apparatus including a zoom lens according to Embodiment 3 of the present invention.

FIG. 7 is a schematic view of a major part of an image projection apparatus including a zoom lens according to Embodiment 4 of the present invention.

FIGS. 8A and 8B illustrates aberration diagrams of a zoom lens according to Numerical Example 4.

FIGS. 10A and 10B illustrates aberration diagrams of a zoom lens according to Numerical Example 5.

DESCRIPTION OF THE EMBODIMENTS

Figure 1:
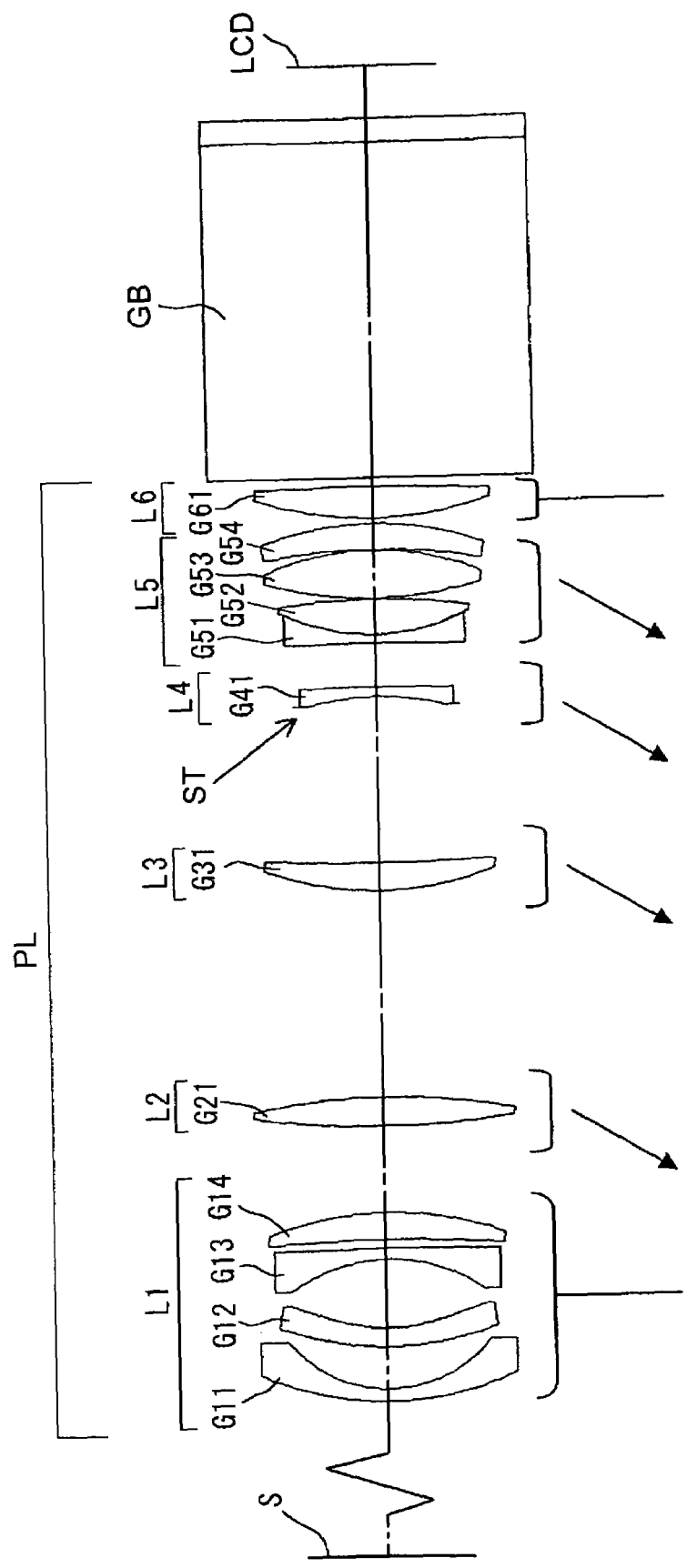
FIG. 1 is a schematic view of a major part of an image projection apparatus including a zoom lens according to Embodiment 1 of the present invention.

One aspect of the present invention is directed to provide a zoom lens which has satisfactory optical properties across the overall screen by satisfactorily compensating for various aberrations generated in accordance with zooming, while miniaturizing the overall lens system and which is suitable for use in a liquid crystal projector, for example.

Another aspect of the present invention is directed to a zoom lens achieving a large screen projection with a short projection distance, in addition to readily achieving large magnification of varying, and having a long back focus.

According to one embodiment of the present invention, a zoom lens includes a plurality of lens groups including a first lens group arranged on the foremost side (on the magnification conjugate side, i.e., with respect to an image projection apparatus, close to a projection surface such as a screen) and having negative optical power. In the meantime, the lens group can be configured as long as it includes at least one optical element such as a lens (a dioptric element) or a diffractive optical element. Zooming is performed by moving at least one of the plurality of lens groups along a direction parallel to an optical axis of the zoom lens. The first lens group is fixed during the zooming. A first lens arranged on the foremost side, of the first lens group has negative refractive power. When an Abbe constant and a partial dispersion of a material configuring the first lens are respectively represented by $vdn$ and $\theta g, Fn$, a focal distance of the first lens group is represented by $f1$, and an air-equivalent back focus upon focusing on an infinity object located at an infinity distance from the zoom lens is represented by $bf$ (in other words, $bf$ represents an air-equivalent value of a back focus length of the zoom lens when the zoom lens is focused at the infinity, that is, of the length between the lens surface arranged closest to the reduction side and the reduction conjugate position, the following conditions are satisfied:

$$vdn < 32 \qquad (1),$$

$$0.008 < \theta g, Fn - (0.644 - 0.00168 \times vdn) < 0.040 \qquad (2),$$

and $$|f1|/bf < 0.9 \qquad (3).$$

According to another embodiment of the present invention, a zoom lens includes a plurality of lens groups including a first lens group arranged on the foremost side, having negative optical power. Zooming is performed by moving at least one of the plurality of lens groups along a direction parallel to an optical axis of the zoom lens. A rearmost lens group of the plurality of lens groups is fixed during the zooming. A first lens arranged on the foremost side, of the first lens group has negative refractive power. When an Abbe constant and a partial dispersion of a material configuring the first lens are respectively represented by $vdn$ and $\theta g, Fn$; a focal distance of the first lens group is represented by $f1$; and an air-equivalent back focus upon focusing on an infinity object is represented by $bf$, the following conditions are satisfied:

$$vdn < 32 \qquad (1),$$

$$0.008 < \theta g, Fn - (0.644 - 0.00168 \times vdn) < 0.040 \qquad (2),$$

and $$|f1|/bf < 0.9 \qquad (3).$$

The zoom lens has a positive lens arranged on the rearmost side (on the reduction conjugate side, i.e., in the case of an image projection apparatus, close to an image display device or a liquid crystal panel). When an Abbe constant and a partial dispersion of a material configuring the positive lens are respectively represented by $vdp$ and $\theta g, Fp$, the following conditions are satisfied:

$$vdp > 63, \qquad (4), \text{ and}$$

$$-0.005 < \theta g, Fp - (0.644 - 0.00168 \times vdp) < 0.045 \qquad (5).$$

Also, the zoom lens has a prism arranged between a rearmost lens and an image plane. When an Abbe constant and a partial dispersion of a material configuring the prism are respectively represented by $vdpr$ and $\theta g, Fr$, the following conditions are satisfied:

$$vdpr < 50, \qquad (6), \text{ and}$$

$$0.002 < \theta g, Fr - (0.644 - 0.00168 \times vdpr) < 0.040 \qquad (7).$$

In order from the front to rear sides of the zoom lens, the plurality of lens groups can include the first lens group having negative refractive power, a second lens group having positive refractive power, a third lens group having positive refractive power, a fourth lens group having negative refractive power, a fifth lens group having positive refractive power, and a sixth lens group having positive refractive power. Upon zooming, the first and sixth lens groups can be fixed and the second through fifth lens groups can be movable. Also, the lens group arranged on the rearmost side can be identical to the sixth lens group.

The zoom lens can include an aspherical lens having at least one aspherical surface. In particular, the fifth lens group can include at least one plastic positive lens having an aspherical surface. Also, the first lens group can include at least one plastic negative lens having an aspherical surface.

The fifth lens group can include at least one positive lens. When the average Abbe constant of a material configuring the at least one positive lens is represented by ν5p, the following condition can be satisfied:

$$\nu 5p > 60 \quad (8).$$

The fourth lens group can include an aperture and at least one meniscus negative lens having a convex rear surface.

In order from the front to rear sides thereof, the plurality of lens groups can include the first lens group having negative refractive power, the second lens group having positive refractive power, the third lens group having positive refractive power, the fourth lens group having positive refractive power, and the fifth lens group having positive refractive power. Upon zooming, the first and fifth lens groups can be fixed and the second through fourth lens groups can be movable.

The fourth lens group can include at least one positive lens. When the average Abbe constant of a material configuring the at least one positive lens is represented by ν4p, the following condition can be satisfied:

$$\nu 4p > 60 \quad (9).$$

The fourth lens group can include an aperture and a meniscus negative lens on the foremost side, having a convex rear surface.

A zoom lens according to another embodiment of the present invention can include five or six lens groups as a whole, including the first lens group arranged on the foremost side and having negative refractive power. Upon zooming, the first lens group and a rearmost lens group can be fixed and a plurality of the lens groups can be movable. Negative and positive lenses Ln and Lp are respectively arranged on the foremost side and closest to an image. When an Abbe constant and a partial dispersion of a material configuring the negative lens Ln are respectively represented by νdn and θg,Fn and an Abbe constant and a partial dispersion of a material configuring the positive lens Lp are respectively represented by νdp and θg,Fp; a focal distance of the first lens group is defined f1; and an air-equivalent back focus is represented by bf, the following conditions can be satisfied:

$$\nu dn < 32 \quad (1),$$

$$0.008 < \theta g, Fn - (0.644 \times 0.00168 - \nu dn) < 0.040 \quad (2),$$

$$|f1/bf| < 0.9 \quad (3),$$

$$\nu dp > 63 \quad (4), \text{ and}$$

$$-0.005 < \theta g, Fp - (0.644 - 0.00168 \times \nu dp) < 0.045 \quad (5).$$

The zoom lens can have an Fno at its wide-angle end, not smaller than 1.4 and not greater than 2.05, desirably not smaller than 1.5 and/or not greater than 1.9.

An image projection apparatus according to another embodiment of the present invention includes any one of the foregoing zoom lenses and a display unit forming an original image. With this zoom lens, the original image formed by the display unit is projected onto a screen surface (a projection surface; as a matter of course, in the case of a rear production type apparatus, it should include lenticular lenses or the like so as to disperse incident light).

Drawings illustrating the embodiments of the present invention will be briefly described.

FIG. 1 is a schematic view of a major part of an image projection apparatus (a liquid-crystal video projector) including a zoom lens according to Embodiment 1 of the present invention. FIGS. 2A and 2B illustrate aberration diagrams of a zoom lens according to Numerical Example 1, which will be described later and corresponds to Embodiment 1 of the present invention, at its wide angle end (close to its short-distance focal point) and at the telephoto end (close to its long-distance focal point), when numerical values of Numerical Example 1 are expressed in mm and an object distance (a distance from the first lens group) is 2.1 m.

Figure 3:
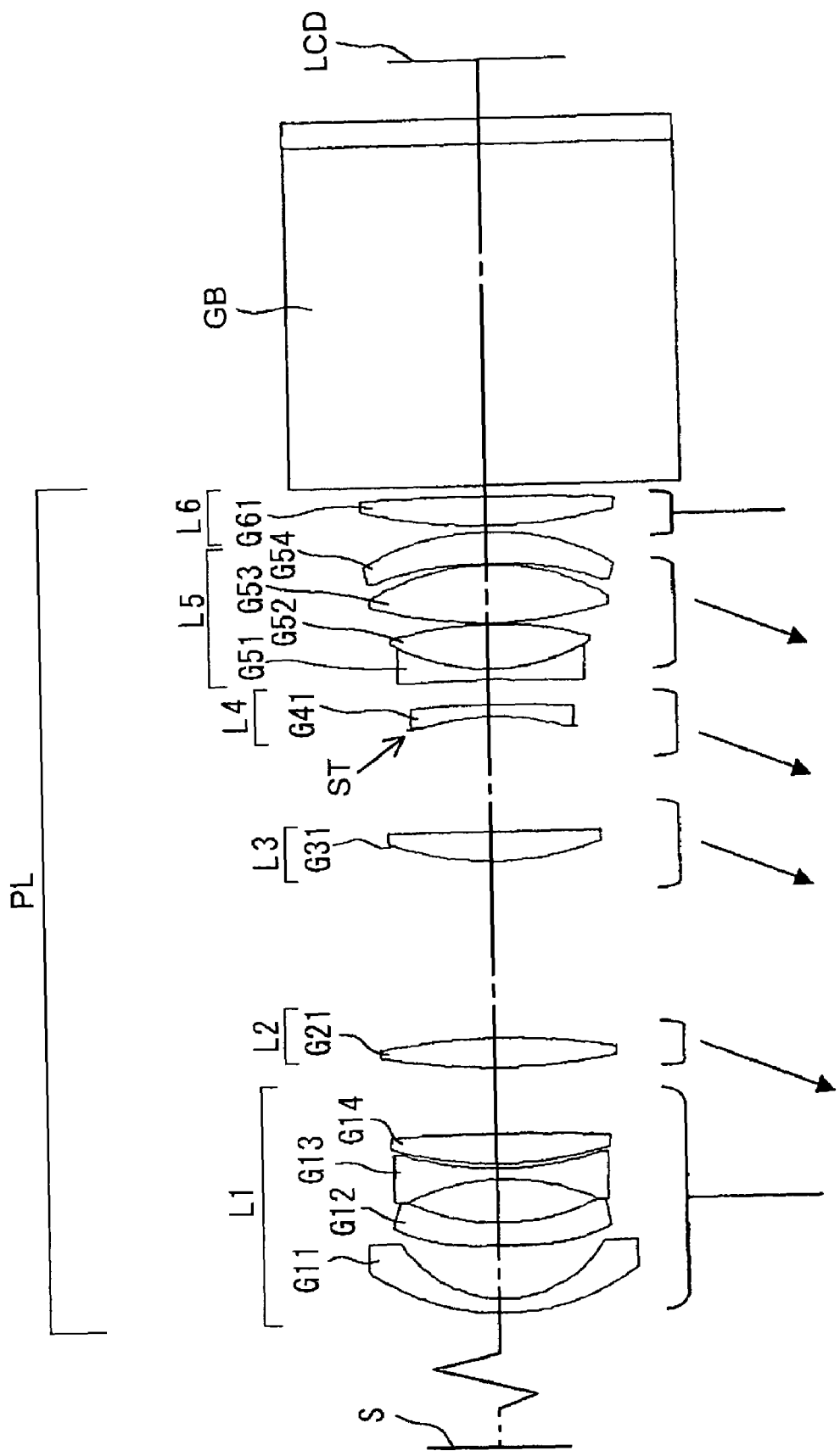
FIG. 3 is a schematic view of a major part of an image projection apparatus including a zoom lens according to Embodiment 2 of the present invention.
Figure 4A:
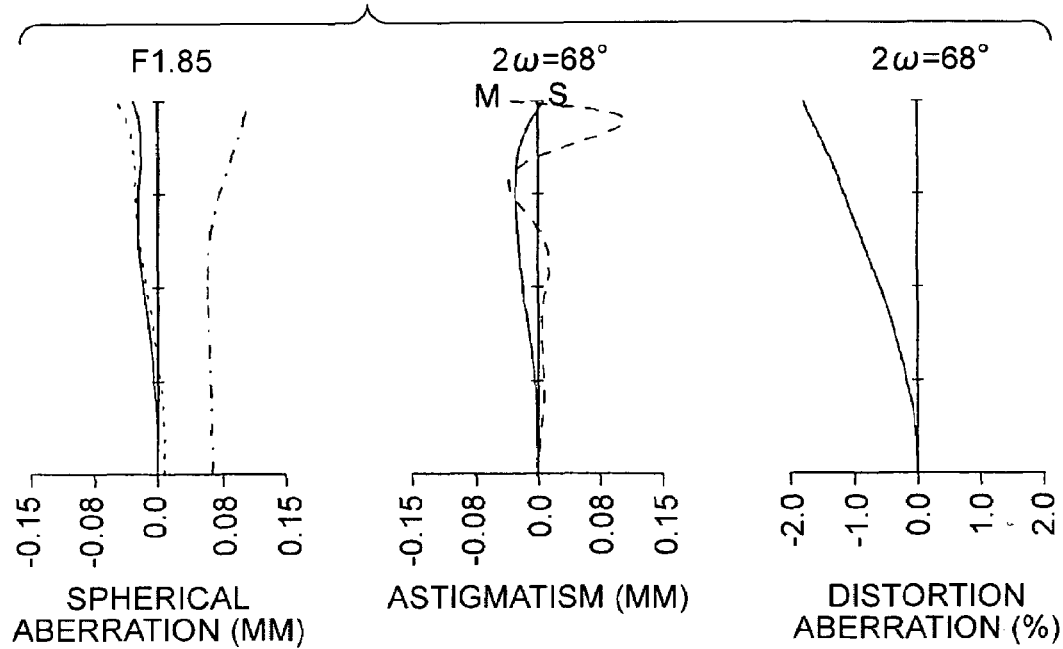
FIGS. 4A and 4B illustrates aberration diagrams of a zoom lens according to Numerical Example 2.
Figure 4B:
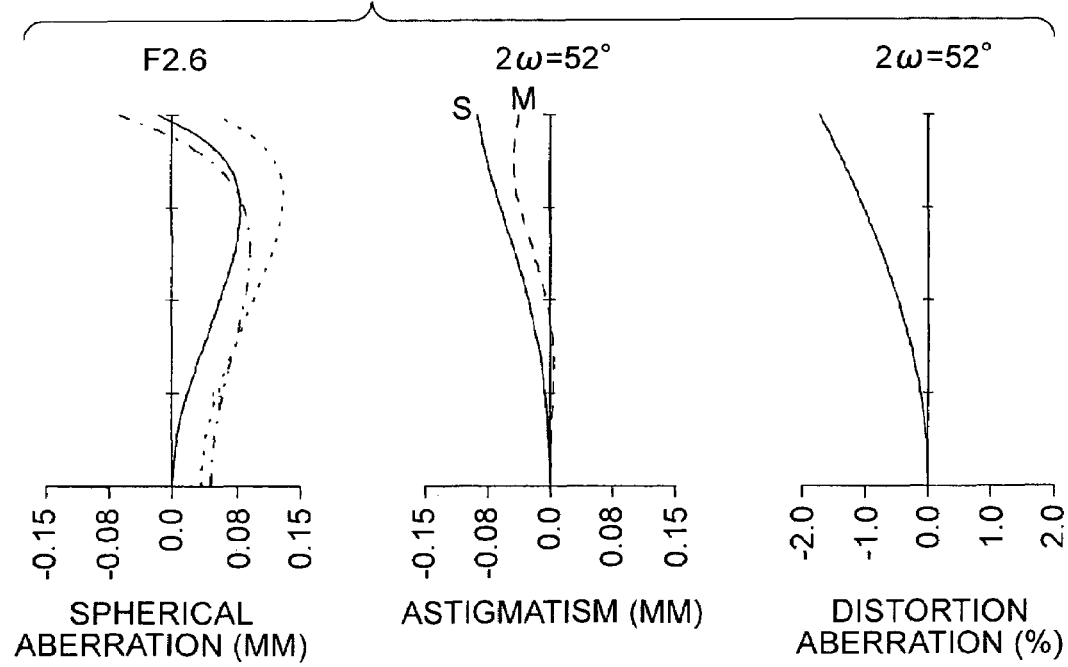

FIG. 3 is a schematic view of a major part of an image projection apparatus (a liquid-crystal video projector) including a zoom lens according to Embodiment 2 of the present invention. FIGS. 4A and 4B illustrate aberration diagrams of a zoom lens according to Numerical Example 2, which will be described later and corresponds to Embodiment 2 of the present invention, at its wide angle end (close to its short-distance focal point) and at the telephoto end (close to its long-distance focal point), when numerical values of Numerical Example 2 are expressed in mm and an object distance (a distance from the first lens group) is 2.1 m.

Figure 6A:
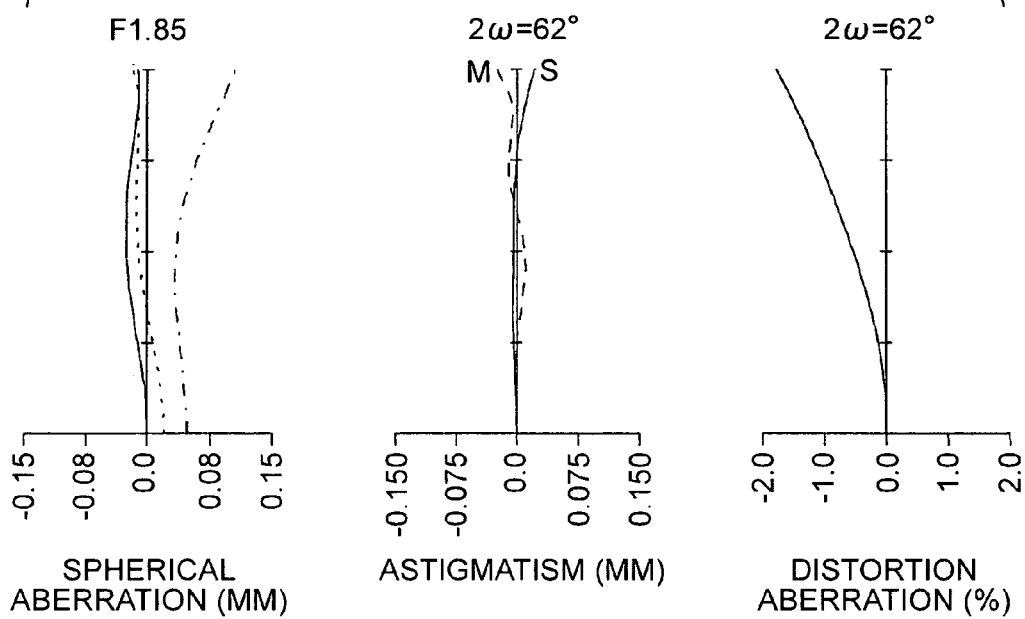
FIGS. 6A and 6B illustrates aberration diagrams of a zoom lens according to Numerical Example 3.
Figure 6B:
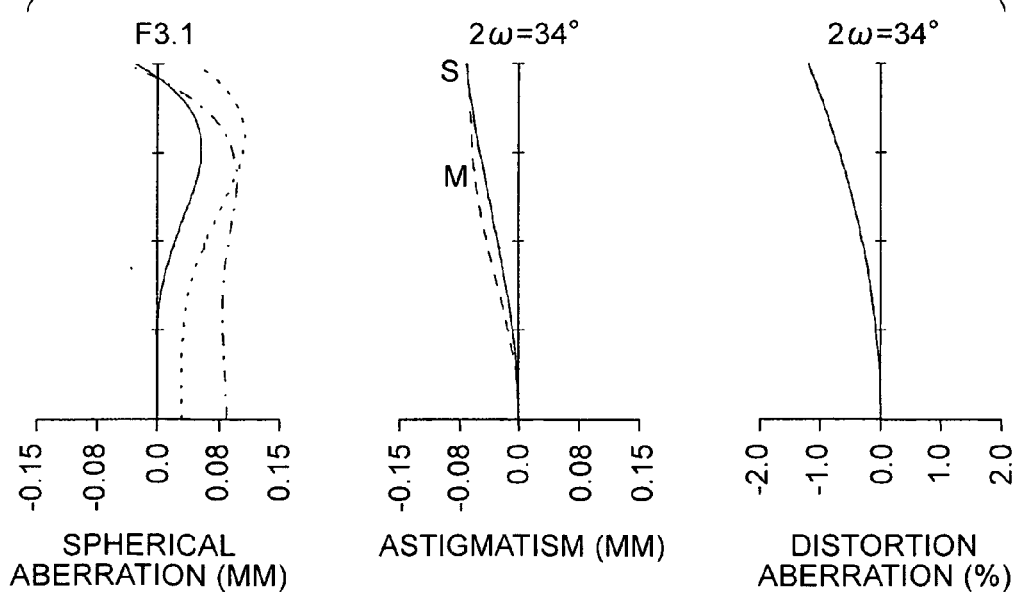

FIG. 5 is a schematic view of a major part of an image projection apparatus (a liquid-crystal video projector) including a zoom lens according to Embodiment 3 of the present invention. FIGS. 6A and 6B illustrate aberration diagrams of a zoom lens according to Numerical Example 3, which will be described later and corresponds to Embodiment 3 of the present invention, at its wide angle end (close to its short-distance focal point) and at the telephoto end (close to its long-distance focal point), when numerical values of Numerical Example 3 are expressed in mm and an object distance (a distance from the first lens group) is 2.1 m.

FIG. 7 is a schematic view of a major part of an image projection apparatus (a liquid-crystal video projector) including a zoom lens according to Embodiment 4 of the present invention. FIGS. 8A and 8B illustrate aberration diagrams of a zoom lens according to Numerical Example 4, which will be described later and corresponds to Embodiment 4 of the present invention, at its wide angle end (close to its short-distance focal point) and at the telephoto end (close to its long-distance focal point), when numerical values of Numerical Example 4 are expressed in mm and an object distance (a distance from the first lens group) is 2.1 m.

Figure 9:
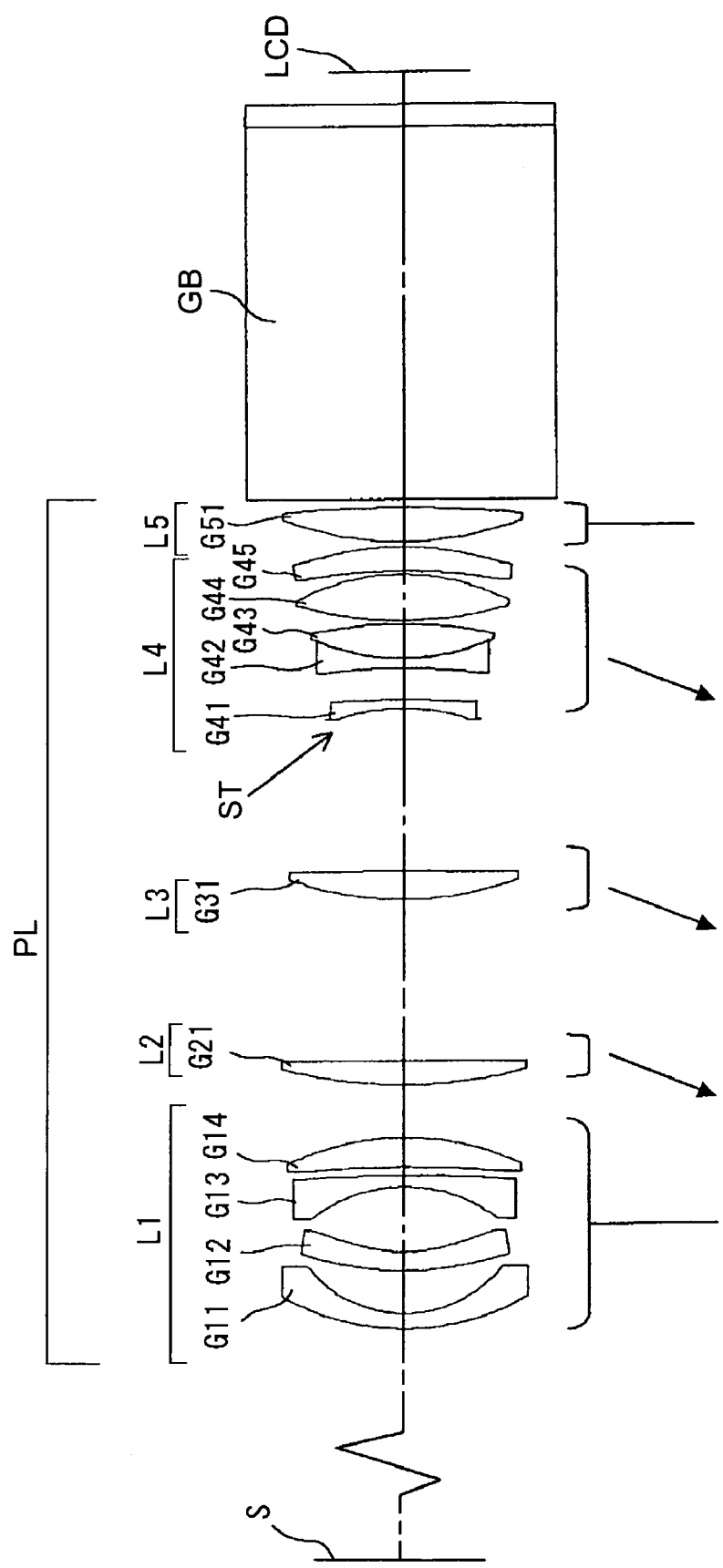
FIG. 9 is a schematic view of a major part of an image projection apparatus including a zoom lens according to Embodiment 5 of the present invention.

FIG. 9 is a schematic view of a major part of an image projection apparatus (a liquid-crystal video projector) including a zoom lens according to Embodiment 5 of the present invention. FIGS. 10A and 10B illustrate aberration diagrams of a zoom lens according to Numerical Example 5, which will be described later and corresponds to Embodiment 5 of the present invention, at its wide angle end (close to its short-distance focal point) and at the telephoto end (close to its long-distance focal point), when numerical values of Numerical Example 5 are expressed in mm and an object distance (a distance from the first lens group) is 2.1 m.

FIGS. 1, 3, 5, 7, and 9 illustrate the image projection apparatuses, respectively, according to the first, second, third, fourth, and fifth embodiments, each in a states in which an original image (an image to be projected) formed by an LCD is projected onto a screen S in a magnified manner with a zoom lens (a projection lens) PL.

In the figures, a screen surface (a projection surface) is denoted by S and a display device such as a liquid crystal panel (a liquid crystal display), for forming an original image (an image to be projected) is denoted by LCD. The screen surface S and the original-image-forming LCD have a conjugated relationship with each other, and generally, the screen surface S and the original-image-forming LCD respectively correspond to a longer distance conjugate point (a first conjugate point) located on the magnification side (frontward) and a shorter conjugate point (a second conjugate point) located on the reduction side (rearwards). Meanwhile, when the zoom lens is used so as to serve as an image-capturing system, the screen surface S and the original-image-forming LCD are respectively located close to an object and close to an image.

Corresponding to a color synthesis prism, a polarizing filter, a color filter, and the like, a glass block (a prism) GB is provided from the viewpoint of optical design.

The zoom lens PL is mounted on the main body of a liquid-crystal video projector (not shown) with the aid of a connecting member (not shown). A part of the zoom lens extending from the glass block GB to the liquid crystal display LCD is included in the main body of the projector.

In the first, second, third, and fourth embodiments respectively illustrated in FIGS. 1, 3, 5, and 7, the first lens group L1 has negative refractive power, the second lens group L2 has positive refractive power, the third lens group L3 has positive refractive power, the fourth lens group L4 has negative refractive power, the fifth lens group L5 has positive refractive power, and the sixth lens group L6 has positive refractive power.

In Embodiments 1 to 4, upon zooming (magnification of varying) from the wide-angle end to the telephoto end, the second lens group L2, the third lens group L3, the fourth lens group L4, and the fifth lens group L5 are independently moved towards the first conjugate point (the screen S), i.e., towards the magnification side as indicated by the corresponding arrows.

The first lens group L1 and the sixth lens group L6 are not moved for the zooming. The first lens group L1 is moved along the optical axis for focusing. Meanwhile, the focusing may be conducted by moving the display panel LCD.

The third lens group L3 and the fourth lens group L4 have an aperture ST interposed therebetween. Each lens surface has an antireflective multi-layer coat formed thereon.

In Embodiment 5 illustrated in FIG. 9, the first lens group L has negative refractive power, the second lens group L2 has positive refractive power, the third lens group L3 has positive refractive power, the fourth lens group L4 has negative refractive power, and the fifth lens group L5 has positive refractive power.

In Embodiment 5, upon zooming (upon magnification of varying) from the wide-angle end to the telephoto end, the second lens group L2, the third lens group L3, and the fourth lens group L4 are independently moved towards the first conjugate point (the screen S), i.e., towards the magnification side as indicated by the corresponding arrows.

The first lens group L1 and the fifth lens group L5 are not moved for the zooming. The first lens group L1 is moved along the optical axis for focusing. Meanwhile, the focusing may be conducted by moving the display panel LCD.

The third lens group L3 and the fourth lens group L4 have the aperture ST interposed therebetween. Each lens surface has an antireflective multi-layer coat formed thereon.

In the aberration diagrams illustrated in FIGS. 2, 4, 6, 8, and 10, aberrations at wavelengths of 550 nm, 620 nm, and 450 nm are respectively denoted by G, R, and B; slants of sagittal and meridional image surfaces indicating aberrations both at a wavelength of 550 nm are respectively denoted by S and M; and an F-number and half angle of view are respectively denoted by F and ω.

Each embodiment satisfies the following conditions.

(A) The zoom lens includes the plurality of lens groups including the first lens group L1 arranged on the foremost side (on the magnification conjugate side, i.e., close to a conjugate point having a longer conjugate length) and having negative optical power is provided. Zooming is performed by moving at least one (desirably a plurality) of the plurality of lens groups along a direction parallel to an optical axis of the zoom lens (as a matter of course, it may be moved in a direction orthogonal to the optical axis). The first lens group L1 includes a first lens G11 arranged on the foremost side (closest to an object) and having negative refractive power. When an Abbe constant and a partial dispersion of a material configuring the first lens G11 are respectively represented by νdn and θg,Fn; a focal distance of the first lens group is represented by f1; and an air-equivalent back focus upon focusing on an infinity object is represented by bf, the following conditions are satisfied:

$$\nu dn < 32 \tag{1},$$

$$0.008 < \theta g, Fn - (0.644 - 0.00168 \times \nu dn) < 0.040 \tag{2},$$

and $$|f1/bf| < 0.9 \tag{3},$$

wherein $\nu dn = (nd-1)/(nF-nC)$;
$\theta g, Fn = (ng-nF)/(nF-nC)$;
nd is a refractive index with d line (587.56 nm);
ng is a refractive index with g line (435.84 nm);
nF is a refractive index with F line (486.13 nm); and
nC is a refractive index with C line (656.28 nm), (hereinafter, an Abbe constant, a refractive index, nd, ng, nF, and nC are defined in the same way as defined above).

The conditional expression (1) defines such that the negative lens closest to the object is composed of a material having a high dispersion (i.e., a small Abbe constant) and especially serves so as to satisfactorily compensate for a chromatic aberration. In general, a high dispersion material is likely to have a high refractive index. Hence, the tendency of the material of the lens closest to the object to have a greater effective diameter, serving as a feature of a retrofocus type zoom lens, is eased. An effect of compensating for a longitudinal chromatic aberration and a chromatic aberration of magnification decreases in an area exceeding the upper limit given by the conditional expression (1).

The conditional expression (2) defines an abnormal partial dispersion of the material and serves so as to effectively compensate for mainly the longitudinal chromatic aberration and the chromatic aberration of magnification. An effect of compensating for the longitudinal chromatic aberration and the chromatic aberration of magnification decreases in the areas exceeding the lower and upper limits given by the conditional expression (2).

The conditional expression (3) serves so as to easily obtain a long back focus. Exceeding the upper limit given by the conditional expression (3) causes a shorter back focus, resulting in difficulty in obtaining a necessary length of the back focus for accommodating a prism and the like therein.

An Abbe constant νdn in the expression (1) can further satisfy the following expression:

$$\nu dn < 28 \tag{1a}.$$

A partial dispersion θg,Fn in the expression (2) can further satisfy the following expression:

$$0.010 < \theta g, Fn - (0.644 - 0.00168 \times vdn) < 0.030 \qquad (2a).$$

An absolute value |f1/bf| of the ratio of a focal length f1 and an air-equivalent back focus bf in the expression (3) can further satisfy the following expression:

$$|f1/bf| < 0.8 \qquad (3a).$$

(B) A positive lens is arranged on the rearmost side. When an Abbe constant and a partial dispersion of a material configuring the positive lens are respectively represented by vdp and θg,Fp, the following conditions are satisfied:

$$vdp > 63, \text{ and} \qquad (4),$$

$$-0.005 < \theta g, Fp - (0.644 - 0.00168 \times vdp) < 0.045 \qquad (5),$$

wherein vdp=(nd−1)/(nF−nC) and θg,Fp=(ng−nF)/(nF−nC).

The conditional expression (4) defines an Abbe constant of a material configuring a positive lens closest to the image plane and serves so as to satisfactorily compensate for the chromatic aberration while mainly maintaining telecentricity.

The conditional expression (5) defines an abnormal partial dispersion of the material configuring the positive lens closest to the image plane and serves so as to effectively compensate for mainly the longitudinal chromatic aberration and the chromatic aberration of magnification. An effect of compensation for the longitudinal chromatic aberration and the chromatic aberration of magnification decreases in the areas exceeding the upper and lower limits given by the conditional expression (5).

(C) At least one prism is arranged between a rearmost lens and an image plane. When an Abbe constant and a partial dispersion of a material configuring the prism GB having the longest prism length are respectively represented by vdpr and θg,Fr, the following conditions are satisfied:

$$vdpr < 50, \text{ and} \qquad (6), \text{ and}$$

$$0.002 < \theta g, Fr - (0.644 - 0.00168 \times vdpr) < 0.040 \qquad (7),$$

wherein vdpr=(nd−1)/(nF−nC) and θg,Fr=(ng−nF)/(nF−nC).

The conditional expression (6) defines an Abbe constant of a material configuring the prism. The optical properties of the zoom lens deeply depend not only on its lens part but also on the material of the prism. Hence, with respect to a liquid crystal projector-use projection lens having a long prism length in its back focusing section, an Abbe constant of the material configuring the prism should be selected so as to satisfy the expression (6). Alternatively, prisms composed of different materials satisfying the conditional expression (6) may be combined. When the conditional expression (6) is satisfied, a great effect of compensating for mainly the longitudinal chromatic aberration, a spherical aberration, and a coma aberration is achieved.

The conditional expression (7) defines an abnormal partial dispersion of the material and serves so as to effectively compensate for the longitudinal chromatic aberration and the chromatic aberration of magnification. An effect of compensating for the longitudinal chromatic aberration and the chromatic aberration of magnification decreases in the areas exceeding the lower and upper limits given by the conditional expression (7).

An Abbe constant vdn in the conditional expression (6) can further satisfy the following expression:

$$vdpr < 40 \qquad (6a).$$

Also, a popular glass material such as S-BSL7 (made by HOYA Corporation), having a large Abbe constant may be used.

(D) In each of Embodiments 1 to 4, the zoom lens includes six lens groups of, in order from the front to rear sides thereof, the first lens group fixed upon zooming (magnification of varying) and having negative refractive power, the second lens group having positive refractive power, the third lens group having positive refractive power, the fourth lens group having negative refractive power, the fifth lens group having positive refractive power and the sixth lens group fixed upon zooming and having positive refractive power.

The zoom lens is configured by the six lens groups as a whole and serves as a retrofocus-type lens system. Hence, the zoom lens has a lens configuration suitable for maintaining satisfactory telecentricity across the overall zooming range and compensating for the aberrations, while miniaturizing the overall lens system by appropriately arranging the respective lens groups. Also, the first lens group L1 and the sixth lens group L6 are both fixed upon zooming (for zooming) so that the zooming does not cause the overall length of the zoom lens to change, thereby achieving robustness necessary for a projection lens and offering a structural advantage.

The fifth lens group L5 includes a plastic lens including an aspherical surface and having positive refractive power.

The reason for this structure is such that, in order to provide satisfactory telecentricity on the rearmost side (on the reduction conjugate side) of the zoom lens, the lens composed of a plastic having relatively strong positive refractive power is used. By providing an aspherical surface on the lens, a remaining off-axis aberration is effectively eliminated. While the lens should be composed of a plastic from the viewpoint of easy manufacturing, a hybrid aspherical lens or a glass-formed aspherical lens may be used instead of the plastic lens.

The first lens group L1 includes at least one aspherical lens composed of a plastic having negative refractive power. With this, the lens having negative power works effectively in the first lens group L1 required to have strong power (refractive power), which is a feature of a wide-angle lens type (a retrofocus type) zoom lens having a long back focus.

Also, since the first lens group L1 has a greater aperture than those of the other lens groups, the density of light beams at the time of projection is low. Accordingly, an aspherical surface for appropriately compensating for the light beams is easily set, thereby reducing loads of the other lenses for achieving aberration compensation. In addition, this structure has effect on reducing the number of lenses, thereby offering an advantage from the manufacturing viewpoint.

While use of a plastic material is advantageous from the manufacturing viewpoint, a hybrid aspherical lens or a glass-formed aspherical lens may be used instead of the plastic lens.

When the average Abbe constant of positive lenses in the fifth lens group L5 is represented by v5p, the following conditional expression (8) is satisfied:

$$v5p > 60 \qquad (8).$$

The conditional expression (8) serves so as to achieve satisfactory telecentricity on an image plane by applying a material having a large Abbe constant on the positive lens having relatively strong power in the fifth lens group L5 while inhibiting generation of the chromatic aberration.

In the retrofocus-type zoom lens configured by the six lens groups, the fourth lens group L4 includes an aperture SP and a meniscus negative lens having at least a convex surface close to the image plane.

By providing a concentric shape to the aperture SP, the fourth lens group L4 has relatively strong negative power while inhibiting generation of a distortion aberration. This structure is effective for compensating for movement of a focus plane upon zooming in order to achieve a high magnification zooming ratio and reducing the overall length of the zoom lens.

(E) The zoom lens according to Embodiment 5 includes five lens groups of, in order from the front to rear sides thereof, the first lens group L1 fixed upon zooming and having negative refractive power, the second lens group L2 having positive refractive power, the third lens group L3 having positive refractive power, the fourth lens group L4 having positive refractive power, and the fifth lens group L5 fixed upon zooming and having positive refractive power.

The zoom lens is configured by the five lens groups as a whole and serves as a retrofocus-type lens system. Hence, the configuration of the zoom lens is suitable for maintaining satisfactory telecentricity across the overall zooming range and compensating for the aberrations, while miniaturizing the overall lens system by appropriately arranging the respective lens groups. Also, the first lens group L1 and the five lens group L5 are both fixed upon zooming so that the zooming does not cause the overall length of the zoom lens to change, thereby achieving robustness necessary for a projection lens and offering a structural advantage. Regarding the lens configuration of the lens groups of the zoom lens according to each of Embodiments, the lens configuration is not limited to those of the six and five lens group types. Instead, at least two lens groups in the two, three, and four lens group types may be moved upon magnification of varying.

In the five-group zoom lens, the fourth lens group L4 includes at least one positive plastic lens having an aspherical surface. With this, the positive lens has relatively strong power in order to provide telecentricity on the rearmost side of the zoom lens. By providing an aspherical effect to the positive lens, the remaining off-axis aberration is effectively eliminated. Other than a plastic lens, a hybrid aspherical lens or a glass-formed aspherical lens may be used.

In the five-group zoom lens, the first lens group L1 includes at least one aspherical lens composed of a plastic having negative refractive power. With this, the lens having negative power works effectively in the first lens group L1 required to have strong power, which is a feature of a wide-angle lens type (a retrofocus type) zoom lens having a long back focus.

Since the first lens group L1 has a greater aperture than those of the other lens groups, the density of light beams at the time of projection is low. Accordingly, an aspherical surface for appropriately compensating for the light beams is easily set, thereby reducing loads of the other lenses for aberration compensation and in addition, having effect on reducing the number of lenses.

Instead of the plastic lens, a hybrid aspherical lens or a glass-formed aspherical lens may be used.

When the average Abbe constant of a material configuring a positive lens in the fourth lens groups is represented by ν4p, the following conditional expression (9) is satisfied:

$$\nu 4p > 60 \tag{9}$$

The conditional expression (9) serves so as to achieve satisfactory telecentricity on an image plane by applying a material having a large Abbe constant on the positive lens having relatively strong power while inhibiting generation of the chromatic aberration.

In the zoom lens configured by the five lens groups, the fourth lens group L4 includes the aperture SP and also the meniscus negative lens having a convex surface close to an object.

With this structure, in the zoom lens configured by the five lens groups, by providing a concentric lens shape to the aperture SP, a lens having relatively strong negative power can be used while inhibiting generation of a distortion aberration, thereby achieving a high magnification zooming ratio and reducing the overall length of the zoom lens.

(F) In the zoom lens according to each embodiment, when a plastic lens is employed, especially in a liquid crystal projector, the temperature of the lens increases and the plastic lens is more liable to the influence of the temperature than a glass lens. Accordingly, in order to employ a plastic lens, the zoom lens must be configured so as to have relatively weak power, in other words, power changing little with a temperature increase, resulting in a limit to employing the plastic lens.

In general, a change in refractive index of a material of the lens due to its temperature increase causes positive and negative plastic lenses to have tendencies to shift a focal position rearwards (towards an image) more and less than designed, respectively.

Hence, when a pair of positive and negative plastic lenses are employed, directions of sifting the focal position are paired off with each other, thereby effectively providing power to the plastic lenses while inhibiting a focal shift due to their temperature change. The following conditional expression (a) offers indication of incorporating the plastic lenses in the zoom lens:

$$-0.05 > fn/fp > -0.56 \tag{a}$$

wherein fn and fp are respectively focal distances of the negative and positive plastic lenses.

Since a level of positive power is excessively greater than that of negative power in an area exceeding the lower limit given by the conditional expression (a), an influence due to the temperature change of the positive plastic lens is significant, resulting in excessively shifting the focal point more than designed. Also, a level of negative power is excessively greater than that of positive power in an area exceeding the upper limit given by the conditional expression (a), an influence due to the temperature change of the negative plastic lens is significant, resulting in excessively shifting the focal point less than designed.

Features of the zoom lens according to each embodiment will be described.

(i) The zoom lens according to each embodiment includes five or six lens groups as a whole, wherein a lens group having negative refractive power is located on the foremost side.

(ii) Each lens group may include a diffractive optics, a catoptrical optics, and the like in addition to lenses.

EMBODIMENT 1

FIG. 1 is a schematic view of a major part of an image projection apparatus (a liquid-crystal video projector) having the zoom lens according to Embodiment 1 incorporated therein. Tables 1 and 2 show data (optical data) of the lens according to Embodiment 1. In Tables 9 and 10, radii of curvature of lens surfaces (optical surfaces), surface gaps, and refractive indexes and Abbe constants of glass materials are shown. Since a part of a plurality of lens surfaces is aspherical, the aspherical coefficients of the aspherical surfaces are shown in Tables 1 and 2. Also, since a surface gap between predetermined two lens surfaces changes upon magnification of varying, surface gaps of the two lens surfaces at telephoto end and wide-angle end of the zoom lens are shown in the tables. Numerical values in Tables 1 and 2 are expressed in mm (as a matter course, these values can be treated in another unit). FIGS. 2A and 2B are aberration diagrams at the wide-angle end (close to a short-distance focal point) and the telephoto end (close to a long-distance focal point) when an object distance (a distance from the first lens group to an object) of 2.1 m.

TABLE 1

EMBODIMENT 1
f = 22.0–36.5 Fno = 1.85–2.53

|  | Ri | di | Ni | νi |
|---|---|---|---|---|
| 1 | 48.17797 | 2.1000 | 1.80518 | 25.4 |
| 2 | 21.02255 | 6.8699 |  |  |
| *3 | 39.48183 | 3.1000 | 1.52996 | 55.8 |
| *4 | 24.03284 | 11.1736 |  |  |
| 5 | −27.29939 | 1.7500 | 1.48749 | 70.2 |
| 6 | −1618.318 | 1.5 |  |  |
| 7 | −265.48769 | 4.3994 | 1.83400 | 37.2 |
| 8 | −56.18928 | (d8) |  |  |
| 9 | 39.879 | 4.7985 | 1.83400 | 37.2 |
| 10 | −107.50029 | (d10) |  |  |
| 11 | 51.95061 | 4.5760 | 1.60342 | 38.0 |
| 12 | 321.40468 | (d12) |  |  |
| 13 | (APERTURE) | 1.6086 |  |  |
| 14 | −39.83686 | 1.5000 | 1.75520 | 27.5 |
| 15 | −310.77422 | (d15) |  |  |
| 16 | −372.48925 | 1.5000 | 1.83400 | 37.2 |
| 17 | 34.47372 | 5.7430 | 1.48749 | 70.2 |
| 18 | −101.37253 | 0.1500 |  |  |
| 19 | 63.73334 | 7.8842 | 1.48749 | 70.2 |
| 20 | −43.26493 | 0.1500 |  |  |
| *21 | −106.36784 | 4.1500 | 1.52996 | 55.8 |
| *22 | −53.96491 | (d22) |  |  |
| 23 | 57.67619 | 5.1699 | 1.48749 | 70.2 |
| 24 | −452.65497 | 1.4500 |  |  |
| 25 | ∞ | 55.0000 | 1.84666 | 23.8 |
| 26 | ∞ | 3.8000 | 1.51633 | 64.1 |
| 27 | ∞ | 8.6222 |  |  | a negative lens G13 having a concave front surface, and a positive lens G14 having a convex rear surface.

The negative lens G12 is made as a plastic lens and both surfaces thereof are aspherical. Since both surfaces are aspherical, the plastic lens G12 compensates for mainly a distortion aberration. Also, since the rear surface of the rearmost positive lens G14 is convex, the positive lens G14 compensates for the distortion aberration and an astigmatism. In addition, by incorporating both high and low dispersion glass lenses in the first lens group L1, a chromatic aberration of magnification is inhibited from generation as little as possible.

The second lens group L2 has a single lens configuration of a positive lens G21 having convex lens surfaces on its both sides and compensates for mainly various aberrations generated in the first lens group L1. The positive lens G21 is composed of a material having a high refractive index so as to compensate for the Petzval sum and minimize variations in various aberrations including a spherical aberration at the time of zooming (magnification of varying).

In general, when a curvature of field and the astigmatism are great, for example, at the half-height of the image, resolution sensation deteriorates. Hence, it is important to compensate for the Petzval sum so as to be minimized. In addition, from the viewpoint of compensating for the chromatic aberration, in order to effectively compensating for the chromatic aberration of magnification generated in the first lens group L1, a material having a high refractive index and a low dispersion property is selected for the second lens group L2.

The third lens group L3 is configured by a meniscus positive lens G31 having a convex front surface and serves as a main lens group for performing magnification of varying.

The fourth lens group L4 is configured by a meniscus negative lens G41 having a convex rear surface. While having strong negative refractive power, the negative lens G41 serves so as to compensate for movement of a focus plane generated in accordance with magnification of varying.

With the arrangement of the negative lens G41 having strong negative refractive power, the Petzval sum is effec-

TABLE 2

ASPHERIC DATA

|  | 1/r | κ | A | B | C | D | E |
|---|---|---|---|---|---|---|---|
| *3 | 0.02533 | −0.86529 | −2.10552E−05 | 1.11564E−07 | −4.35408E−10 | 1.14943E−12 | −1.36179E−15 |
| *4 | 0.04161 | −4.32910 | −3.04578E−06 | 4.22209E−08 | −3.68497E−10 | 1.21913E−12 | −1.83226E−15 |
| *21 | −0.00940 | −65.86607 | −1.24675E−05 | 2.94309E−08 | −1.16213E−10 | 3.39774E−13 | −3.00719E−16 |
| *22 | −0.01853 | −7.91329 | −1.00648E−05 | 1.52133E−08 | −6.09115E−11 | 1.87901E−13 | −1.40099E−16 |

GAP DATA

|  | d8 | d10 | d12 | d17 | d24 |
|---|---|---|---|---|---|
| Wide | 14.0690 | 33.9164 | 25.7779 | 7.2136 | 0.9000 |
| Tele | 2.4000 | 2.0357 | 37.9623 | 2.6045 | 36.8743 |

The first lens group L1 has a four-lens configuration including, in order from the front to rear sides thereof, the meniscus negative lens G11 having a convex front surface, a meniscus negative lens G12 having a convex front surface, tively minimized. The aperture ST is present in the fourth lens group L4 and inhibits a variation in an off-axis aberration at the time of zooming. The aperture ST may be set somewhere other than in the fourth lens group L4.

Upon zooming, the aperture ST may be formed so as to move independently without moving together with the lens groups.

The fifth lens group L5 has a four-lens configuration including, in order from the front to rear sides thereof, a negative lens G51 having concave lens surfaces on its both sides and a positive lens G52 having convex lens surfaces on its both sides, these two configuring a cemented lens, a positive lens G53 having convex lens surfaces on its both sides, and a meniscus positive lens G54 having a convex rear surface.

With the arrangement of the negative lens G51 having negative refractive power on the foremost side, the Petzval sum is effectively minimized. Controlling the position of the rear principal point allows a back focus to have a necessary length while achieving satisfactory telecentricity.

In order to minimize the chromatic aberration, a low dispersion glass is employed in the cemented lens and the independent positive lens G53. The rearmost lens G54 is composed of a plastic and both lens surfaces thereof are aspherical, thereby effectively compensating for the off-axis aberration such as the astigmatism.

The sixth lens group L6 is configured by a positive lens G61 having convex lens surfaces on its both sides. While being composed of a low dispersion glass in order to inhibit the chromatic aberration, the positive lens G61 has stronger power so as to improve telecentricity.

While the two aspherical plastic lenses respectively have positive and negative refractive power in the present embodiment, in addition to this configuration, a plurality of plastic lenses may be employed.

The material of the aspherical lens is not limited to a plastic material and may be a glass material. Alternatively, the aspherical lens may have a so-called hybrid aspherical structure in which its optical surface has a thin resin layer formed thereon so as to offer an aspherical shape.

According to the present embodiment, a projection lens capable of offering a high magnification of varying, i.e., a zooming magnification of about 1.7 is achieved, while having features in which its F-number is as small as 1.85 and its 100-model is projectable at a short range of about 3.0 m.

EMBODIMENT 2

FIG. 3 is a schematic view of a major part of an image projection apparatus (a liquid-crystal video projector) having the zoom lens according to Embodiment 2 incorporated therein. Tables 3 and 4 show data (optical data) of the lens according to Embodiment 2. In Tables 3 and 4, radii of curvature of lens surfaces (optical surfaces), surface gaps, and refractive indexes and Abbe constants of glass materials are shown. Since a part of a plurality of lens surfaces is aspherical, the aspherical coefficients of the aspherical surfaces are shown in Tables 3 and 4. Also, since a surface gap between predetermined two lens surfaces changes upon magnification of varying, surface gaps of the two lens surfaces at telephoto end and wide-angle end of the zoom lens are shown in the tables. Numerical values in Tables 3 and 4 are expressed in mm (as a matter course, these values can be treated in another unit). FIGS. 4A and 4B are aberration diagrams at the wide-angle end (close to a short-distance focal point) and the telephoto end (close to a long-distance focal point) when an object distance (a distance from the first lens group to an object) of 2.1 m.

TABLE 3

EMBODIMENT 2
f = 18.4–30.3 Fno = 1.85–2.63

|  | Ri | di | Ni | vi |
|---|---|---|---|---|
| 1 | 30.89556 | 2.0000 | 1.84666 | 23.8 |
| 2 | 16.25391 | 7.2163 |  |  |
| *3 | 111.48919 | 3.2000 | 1.52996 | 55.8 |
| *4 | 34.16444 | 5.9420 |  |  |
| 5 | −30.03606 | 1.5000 | 1.49700 | 81.6 |
| 6 | 44.97378 | 0.6576 |  |  |
| 7 | 52.13529 | 4.0860 | 1.69895 | 30.1 |
| 8 | −249.08891 | (d8) |  |  |
| 9 | 85.3129 | 4.0744 | 1.83400 | 37.2 |
| 10 | −84.49263 | (d10) |  |  |
| 11 | 41.35398 | 4.0486 | 1.62588 | 35.7 |
| 12 | 4880.52702 | 14.3321 |  |  |
| 13 | (APERTURE) | (d13) |  |  |
| 14 | −31.13904 | 1.5000 | 1.78470 | 26.3 |
| 15 | −352.59772 | (d15) |  |  |
| 16 | −185.1227 | 1.5000 | 1.83400 | 37.2 |
| 17 | 26.58768 | 6.2140 | 1.48749 | 70.2 |
| 18 | −47.64016 | 0.1500 |  |  |
| 19 | 57.15633 | 8.0772 | 1.48749 | 70.2 |
| 20 | −31.01415 | 0.1500 |  |  |
| *21 | −70.69805 | 4.3000 | 1.52996 | 55.8 |
| *22 | −41.24778 | (d22) |  |  |
| 23 | 70.17739 | 4.0020 | 1.49700 | 81.6 |
| 24 | −514.06963 | 1.4500 |  |  |
| 25 | ∞ | 47.0000 | 1.84666 | 23.8 |
| 26 | ∞ | 3.4000 | 1.51633 | 64.1 |
| 27 | ∞ | 8.2055 |  |  |

TABLE 4

ASPHERIC DATA

|  | 1/r | κ | A | B | C | D | E |
|---|---|---|---|---|---|---|---|
| *3 | 0.00897 | 49.23525 | 5.08871E−05 | −2.01623E−07 | 5.94120E−10 | −4.57829E−13 | −2.81211E−15 |
| *4 | 0.02927 | 1.77287 | 3.74608E−05 | −2.49124E−07 | 6.11018E−10 | −1.31248E−12 | −2.88279E−15 |
| *21 | −0.01414 | −1.35444 | −1.57784E−05 | −8.08535E−09 | 7.27328E−12 | 1.42953E−14 | 5.88522E−16 |
| *22 | −0.02424 | −2.25517 | −1.52235E−05 | −8.49054E−09 | 2.09653E−11 | −1.04714E−13 | 5.99474E−16 |

GAP DATA

|  | d8 | d10 | d13 | d15 | d22 |
|---|---|---|---|---|---|
| Wide | 9.1171 | 24.3229 | 1.6669 | 3.5430 | 0.9000 |
| Tele | 1.6000 | 0.6000 | 9.7022 | 1.3552 | 26.2922 |

The first lens group L1 has a four-lens configuration including, in order from the front to rear sides thereof, the meniscus negative lens G11 having a convex front surface, the meniscus negative lens G12 having a convex front surface, the negative lens G13 having concave lens surfaces on its both sides, and the positive lens G14 having convex lens surfaces on its both sides.

The negative lens G12 is made as a plastic lens and its both surfaces are aspherical. Since both surfaces are aspherical, the plastic lens G12 compensates for mainly a distortion aberration. Also, since the rear surface of the rearmost positive lens G14 is convex, the positive lens G14 compensates for the distortion aberration and an astigmatism. In addition, by incorporating both high and low dispersion glass lenses in the first lens group L1, a chromatic aberration of magnification is inhibited from generation as little as possible.

The second lens group L2 has a single lens configuration of the positive lens G21 having convex lens surfaces on its both sides and compensates for mainly various aberrations generated in the first lens group L1. The positive lens G21 is composed of a material having a high refractive index so as to compensate for the Petzval sum and minimize variations in various aberrations including a spherical aberration at the time of zooming (magnification of varying).

In general, when a curvature of field and the astigmatism are great, for example, at the height of an intermediate image, resolution sensation deteriorates. Hence, it is important to compensate for the Petzval sum so as to be minimized. In addition, from the viewpoint of compensating for the chromatic aberration, in order to effectively compensating for the chromatic aberration of magnification generated in the first lens group L1, a material having a high refractive index and a low dispersion property is selected for the second lens group L2.

The third lens group L3 is configured by the meniscus positive lens G31 having a convex front surface and serves as a main lens group for performing magnification of varying.

The fourth lens group L4 is configured by the meniscus negative lens G41 having a convex rear surface. While having strong negative refractive power, the negative lens G41 serves so as to compensate for movement of a focus plane generated in accordance with magnification of varying.

With the arrangement of the negative lens G41 having strong negative refractive power, the Petzval sum is effectively minimized. The aperture ST is present in the fourth lens group L4 and inhibits a variation in an off-axis aberration at the time of zooming. The aperture ST may be set somewhere other than in the fourth lens group L4.

Upon zooming, the aperture ST may be formed so as to move independently without moving together with the lens groups.

The fifth lens group L5 has a four-lens configuration including, in order from the front to rear sides thereof, the negative lens G51 having concave lens surfaces on its both sides and the positive lens G52 having convex lens surfaces on its both sides, these two configuring a cemented lens, the positive lens G53 having convex lens surfaces on its both sides, and the meniscus positive lens G54 having a convex rear surface.

With the arrangement of the negative lens G51 having negative refractive power on the foremost side, the Petzval sum is effectively minimized. Controlling the position of the rear principal point allows a back focus to have a necessary length while achieving satisfactory telecentricity.

In order to minimize the chromatic aberration, a low dispersion glass is employed in the cemented lens and the independent positive lens G53. The rearmost lens G54 is composed of a plastic and both lens surfaces thereof are aspherical, thereby effectively compensating for an off-axis aberration such as the astigmatism.

The sixth lens group L6 is configured by the positive lens G61 having convex lens surfaces on its both sides. While being composed of a low dispersion glass in order to inhibit the chromatic aberration, the positive lens G61 has stronger power so as to improve telecentricity.

While the two aspherical plastic lenses respectively have positive and negative refractive power in the present embodiment, in addition to this configuration, a plurality of plastic lenses may be used.

The material of the aspherical lens is not limited a plastic material and may be a glass material. Alternatively, the aspherical lens may have a so-called hybrid aspherical structure in which its optical surface has a thin resin layer formed thereon so as to offer an aspherical shape.

According to the present embodiment, a projection lens capable of offering a high magnification of varying, i.e., a zooming magnification of about 1.7 is achieved, while having features in which its F-number is as small as 1.85 and its 100-model is projectable at a short range of about 2.5 m.

EMBODIMENT 3

FIG. 5 is a schematic view of a major part of an image projection apparatus (a liquid-crystal video projector) having the zoom lens according to Embodiment 3 incorporated therein. Tables 5 and 6 show data (optical data) of the lens according to Embodiment 3. In Table 5 and 6, radii of curvature of lens surfaces (optical surfaces), surface gaps, and refractive indexes and Abbe constants of glass materials are shown. Since a part of a plurality of lens surfaces is aspherical, the aspherical coefficients of the aspherical surfaces are shown in Tables 5, and 6. Also, since a surface gap between predetermined two lens surfaces changes upon magnification of varying, surface gaps of the two lens surfaces at telephoto end and wide-angle end of the zoom lens are shown in the tables. Numerical values in Tables 5 and 6 are expressed in mm (as a matter course, these values can be treated in another unit). FIGS. 6A and 6B are aberration diagrams at the wide-angle end (close to a short-distance focal point) and the telephoto end (close to a long-distance focal point) when an object distance (a distance from the first lens group to an object) of 2.1 m.

TABLE 5

EMBODIMENT 3
f = 20.4–39.7 Fno = 1.85–3.10

| | Ri | di | Ni | vi |
|---|---|---|---|---|
| 1 | 44.57786 | 2.2000 | 1.84666 | 23.8 |
| 2 | 19.26381 | 6.9850 | | |
| *3 | 68.68298 | 3.2000 | 1.52996 | 55.8 |
| *4 | 31.402 | 10.0059 | | |
| 5 | −23.06703 | 2.0000 | 1.48749 | 70.2 |
| 6 | −142.42449 | 4.5000 | 1.69895 | 30.1 |
| 7 | −42.55434 | (d7) | | |
| 8 | 125.67028 | 4.7452 | 1.83400 | 37.2 |
| 9 | −100.0108 | (d9) | | |
| 10 | 49.52234 | 4.4514 | 1.58267 | 46.4 |
| 11 | 445.16477 | 19.4041 | | |
| 12 | (APERTURE) | (d12) | | |
| 13 | −38.68609 | 1.5000 | 1.75520 | 27.5 |
| 14 | −209.17028 | (d14) | | |

TABLE 5-continued

EMBODIMENT 3
f = 20.4–39.7 Fno = 1.85–3.10

|     | Ri         | di      | Ni      | vi   |
|-----|------------|---------|---------|------|
| 15  | −521.00866 | 1.5000  | 1.83400 | 37.2 |
| 16  | 30.28309   | 5.7000  | 1.48749 | 70.2 |
| 17  | −159.49708 | 0.1500  |         |      |
| 18  | 54.58126   | 8.4148  | 1.48749 | 70.2 |
| 19  | −36.95692  | 0.1500  |         |      |
| *20 | −111.70304 | 4.2005  | 1.52996 | 55.8 |
| *21 | −55.88571  | (d21)   |         |      |
| 22  | 113.61568  | 4.2000  | 1.48749 | 70.2 |
| 23  | −158.14288 | 1.4500  |         |      |
| 24  | ∞          | 55.0000 | 1.84666 | 23.8 |
| 25  | ∞          | 3.8000  | 1.51633 | 64.1 |
| 26  | ∞          | 8.6125  |         |      |

TABLE 6

ASPHERIC DATA

|     | 1/r      | κ         | A           | B           | C           | D           | E           |
|-----|----------|-----------|-------------|-------------|-------------|-------------|-------------|
| *3  | 0.01456  | 9.28254   | 2.69498E−06 | 1.66465E−08 | −9.32548E−11 | 4.42842E−13 | −7.57029E−16 |
| *4  | 0.03185  | −4.03516  | 6.46512E−06 | −3.77153E−09 | −1.85042E−10 | 9.50324E−13 | −2.21519E−15 |
| *20 | −0.00895 | −27.97288 | −1.59632E−05 | −1.61790E−08 | 5.12399E−11 | −1.85141E−13 | 3.94901E−16 |
| *21 | −0.01789 | −5.91335  | −1.44712E−05 | −1.18896E−08 | 3.18141E−11 | −1.05013E−13 | 2.27861E−16 |

GAP DATA

|      | d7      | d9      | d12     | d14    | d21     |
|------|---------|---------|---------|--------|---------|
| Wide | 17.5669 | 38.4099 | 1.8750  | 7.9412 | 0.9000  |
| Tele | 1.6000  | 0.6000  | 21.5400 | 0.9875 | 41.9655 |

The first lens group L1 has a four-lens configuration including, in order from the front to rear sides thereof, the meniscus negative lens G11 having a convex front surface, the meniscus negative lens G12 having a convex front surface, the meniscus negative lens G13 having a concave front surface, and the meniscus positive lens G14 having a convex rear surface, wherein the last two lenses configures a cemented lens.

The negative lens G12 is made as a plastic lens and both surfaces thereof are aspherical. Since both surfaces are aspherical, the plastic lens G12 compensates for mainly a distortion aberration. Also, since the rear surface of the rearmost positive lens G14 is convex, the positive lens G14 compensates for the distortion aberration and an astigmatism. In addition, by incorporating both high and low dispersion glass lenses in the first lens group L1, a chromatic aberration of magnification is inhibited from generation as little as possible.

The second lens group L2 has a single lens configuration of a positive lens G21 having convex lens surfaces on its both sides and compensates for mainly various aberrations generated in the first lens group L1. The positive lens G21 is composed of a material having a high refractive index so as to compensate for the Petzval sum and minimize variations in various aberrations including a spherical aberration at the time of zooming (magnification of varying).

In general, when a curvature of field and the astigmatism are great, for example, at the height of an intermediate image, resolution sensation deteriorates. Hence, it is important to compensate for the Petzval sum so as to be minimized. In addition, from the viewpoint of compensating for the chromatic aberration, in order to effectively compensating for the chromatic aberration of magnification generated in the first lens group L1, a material having a high refractive index and a low dispersion property is selected for the second lens group L2.

The third lens group L3 is configured by a meniscus positive lens G31 having a convex front surface and serves as a main lens group for performing magnification of varying.

The fourth lens group L4 is configured by a meniscus negative lens G41 having a convex rear surface. While having strong negative refractive power, the negative lens G41 serves so as to compensate for movement of a focus plane generated in accordance with magnification of varying.

With the arrangement of the negative lens G41 having strong negative refractive power, the Petzval sum is effectively minimized. The aperture ST is present in the fourth lens group L4 and inhibits a variation in an off-axis aberration at the time of zooming. The aperture ST may be set somewhere other than in the fourth lens group L4.

Upon zooming, the aperture ST may be formed so as to move independently without moving together with the lens groups.

The fifth lens group L5 has a four-lens configuration including, in order from the front to rear sides thereof, a negative lens G51 having concave lens surfaces on its both sides and a positive lens G52 having convex lens surfaces on its both sides, these two configuring a cemented lens, a positive lens G53 having convex lens surfaces on its both sides, and a meniscus positive lens G54 having a convex rear surface.

With the arrangement of the negative lens G51 having negative refractive power on the foremost side, the Petzval sum is effectively minimized. Controlling the position of the rear principal point allows a back focus to have a necessary length while achieving satisfactory telecentricity.

In order to minimize the chromatic aberration, a low dispersion glass is employed in the cemented lens and the independent positive lens G53. The rearmost lens G54 is composed of a plastic and both lens surfaces thereof are aspherical, thereby effectively compensating for the off-axis aberration such as an astigmatism.

The sixth lens group L6 is configured by a positive lens G61 having convex lens surfaces on its both sides. While being composed of a low dispersion glass in order to inhibit the chromatic aberration, the positive lens G61 has stronger power so as to improve telecentricity.

While the two aspherical plastic lenses respectively have positive and negative refractive power in the present embodiment, in addition to this configuration, a plurality of plastic lenses may be employed.

The material of the aspherical lens is not limited to a plastic material and may be a glass material. Alternatively, the aspherical lens may have a so-called hybrid aspherical structure in which its optical surface has a thin resin layer formed thereon so as to offer an aspherical shape.

According to the present embodiment, a projection lens capable of offering a high magnification of varying, i.e., a zooming magnification of about 2.0 is achieved, while having features in which its F-number is as small as 1.85 and its 100-model is projectable at a short range of about 2.8 m.

EMBODIMENT 4

FIG. 7 is a schematic view of a major part of an image projection apparatus (a liquid-crystal video projector) having the zoom lens according to Embodiment 4 incorporated therein. Tables 7 and 8 show data (optical data) of the lens according to Embodiment 4. In Tables 7 and 8, radii of curvature of lens surfaces (optical surfaces), surface gaps, and refractive indexes and Abbe constants of glass materials are shown. Since a part of a plurality of lens surfaces is aspherical, the aspherical coefficients of the aspherical surfaces are shown in Tables 7 and 8. Also, since a surface gap between predetermined two lens surfaces changes upon magnification of varying, surface gaps of the two lens surfaces at telephoto end and wide-angle end of the zoom lens are shown in the tables. Numerical values in Tables 7 and 8 are expressed in mm (as a matter course, these values can be treated in another unit). FIGS. 8A and 8B are aberration diagrams at the wide-angle end (close to a short-distance focal point) and the telephoto end (close to a long-distance focal point) when an object distance (a distance from the first lens group to an object) of 2.1 m.

TABLE 7

EMBODIMENT 4
f = 23.5–31.6 Fno = 1.85–2.42

| | Ri | di | Ni | vi |
|---|---|---|---|---|
| 1 | 63.30264 | 2.4000 | 1.84666 | 23.8 |
| 2 | 29.06773 | 4.5021 | | |
| *3 | 57.58216 | 2.2000 | 1.52996 | 55.8 |
| *4 | 28.1121 | 6.7695 | | |
| 5 | −55.43384 | 2.2000 | 1.48749 | 70.2 |
| 6 | 65.18485 | (d6) | | |
| 7 | 99.88649 | 5.4242 | 1.83400 | 37.2 |
| 8 | −78.02861 | (d8) | | |
| 9 | 48.02402 | 4.2979 | 1.83400 | 37.2 |
| 10 | 159.69401 | 22.6710 | | |
| 11 | (APERTURE) | (d11) | | |
| 12 | −36.77684 | 1.5000 | 1.75520 | 27.5 |
| 13 | −205.53931 | (d13) | | |
| 14 | −123.70149 | 1.5000 | 1.83400 | 37.2 |
| 15 | 27.93362 | 5.7000 | 1.60311 | 60.7 |
| 16 | −236.54179 | 0.1500 | | |
| 17 | 53.57628 | 10.0740 | 1.48749 | 70.2 |
| 18 | −31.5691 | 0.1500 | | |
| *19 | −299.47998 | 4.1373 | 1.52996 | 55.8 |
| *20 | −78.88286 | (d20) | | |
| 21 | 91.59604 | 4.5000 | 1.48749 | 70.2 |
| 22 | −221.5602 | 1.4500 | | |
| 23 | ∞ | 55.0000 | 1.84666 | 23.8 |
| 24 | ∞ | 3.8000 | 1.51633 | 64.1 |
| 25 | ∞ | 8.5949 | | |

TABLE 8

ASPHERIC DATA

| | 1/r | κ | A | B | C | D | E |
|---|---|---|---|---|---|---|---|
| *3 | 0.01737 | 8.29005 | −1.53525E−05 | 1.99375E−08 | −1.17593E−10 | 3.26386E−13 | −8.32741E−16 |
| *4 | 0.03557 | −1.97476 | −5.03956E−06 | 7.92029E−09 | 5.34636E−11 | −3.42798E−13 | 4.21247E−16 |
| *19 | −0.00334 | 36.85349 | −1.97384E−05 | −3.50105E−08 | 7.16275E−11 | −3.50947E−13 | 6.96058E−16 |
| *20 | −0.01268 | −1.04980 | −1.58375E−05 | −2.47872E−08 | 3.79764E−11 | −1.56452E−13 | 3.25300E−16 |

GAP DATA

| | d6 | d8 | d11 | d13 | d20 |
|---|---|---|---|---|---|
| Wide | 15.5294 | 30.1400 | 1.8594 | 7.6954 | 0.9000 |
| Tele | 10.6048 | 15.8585 | 11.6223 | 1.4507 | 16.5878 |

The first lens group L1 has a three-lens configuration including, in order from the front to rear sides thereof, the meniscus negative lens G11 having a convex front surface, the meniscus negative lens G12 having a convex front surface, and the negative lens G13 having concave lens surfaces on its both sides.

The negative lens G12 is made as a plastic lens and its both surfaces are aspherical. Since both surfaces are aspherical, the plastic lens G12 compensates for mainly a distortion aberration. Also, since the rear surface of the rearmost positive lens G14 is convex, the positive lens G14 compensates for the distortion aberration and an astigmatism. In addition, by incorporating both high and low dispersion glass lenses in the first lens group L1, a chromatic aberration of magnification is inhibited from generation as little as possible.

The second lens group L2 has a single lens configuration of a positive lens G21 having convex lens surfaces on its both sides and compensates for mainly various aberrations generated in the first lens group L1. The positive lens G21 is composed of a material having a high refractive index so as to compensate for the Petzval sum and minimize variations in various aberrations including a spherical aberration at the time of zooming (magnification of varying).

In general, when a curvature of field and the astigmatism are great, for example, at the height of an intermediate image, resolution sensation deteriorates. Hence, it is important to compensate for the Petzval sum so as to be minimized. In addition, from the viewpoint of compensating for the chromatic aberration, in order to effectively compensating for the chromatic aberration of magnification generated in the first lens group L1, a material having a high refractive index and a low dispersion property is selected for the second lens group L2.

The third lens group L3 is configured by a meniscus positive lens G31 having a convex front surface and serves as a main lens group for performing magnification of varying.

The fourth lens group L4 is configured by a meniscus negative lens G41 having a convex rear surface. While having strong negative refractive power, the negative lens G41 serves so as to compensate for movement of a focus plane generated in accordance with magnification of varying.

With the arrangement of the negative lens G41 having strong negative refractive power, the Petzval sum is effectively minimized. The aperture ST is present in the fourth lens group L4 and inhibits a variation in an off-axis aberration at the time of zooming. The aperture ST may be set somewhere other than in the fourth lens group L4.

Upon zooming, the aperture ST may be formed so as to move independently without moving together with the lens groups.

The fifth lens group L5 has a four-lens configuration including, in order from the front to rear sides thereof, a negative lens G51 having concave lens surfaces on its both sides and a positive lens G52 having convex lens surfaces on its both sides, these two configuring a cemented lens, a positive lens G53 having convex lens surfaces on its both sides, and a meniscus positive lens G54 having a convex rear surface.

With the arrangement of the negative lens G51 having negative refractive power on the foremost side, the Petzval sum is effectively minimized. Controlling the position of the rear principal point allows a back focus to have a necessary length while achieving satisfactory telecentricity.

In order to minimize the chromatic aberration, a low dispersion glass is employed in the cemented lens and the independent positive lens G53. The rearmost lens G54 is composed of a plastic and both lens surfaces thereof are aspherical, thereby effectively compensating for the off-axis aberration such as an astigmatism.

The sixth lens group L6 is configured by a positive lens G61 having convex lens surfaces on its both sides. While being composed of a low dispersion glass in order to inhibit the chromatic aberration, the positive lens G61 has stronger power so as to improve telecentricity.

While the two aspherical plastic lenses respectively have positive and negative refractive power in the present embodiment, in addition to this configuration, a plurality of plastic lenses may be employed.

The material of the aspherical lens is not limited to a plastic material and may be a glass material. Alternatively, the aspherical lens may have a so-called hybrid aspherical structure in which its optical surface has a thin resin layer formed thereon so as to offer an aspherical shape.

According to the present embodiment, a projection lens capable of offering a high magnification of varying, i.e., a zooming magnification of about 1.4 is achieved, while having features in which its F-number is as small as 1.85 and its 100-model is projectable at a short range of about 3.2 m.

EMBODIMENT 5

FIG. 9 is a schematic view of a major part of an image projection apparatus (a liquid-crystal video projector) having the zoom lens according to Embodiment 5 incorporated therein. Tables 9 and 10 show data (optical data) of the lens according to Embodiment 5. In table 9 and 10, radii of curvature of lens surfaces (optical surfaces), surface gaps, and refractive indexes and Abbe constants of glass materials are shown. Since a part of a plurality of lens surfaces is aspherical, the aspherical coefficients of the aspherical surfaces are shown in Tables 9 and 10. Also, since a surface gap between predetermined two lens surfaces changes upon magnification of varying, surface gaps of the two lens surfaces at telephoto end and wide-angle end of-the zoom lens are shown in the tables. Numerical values in Tables 9 and 10 are expressed in mm (as a matter course, these values can be treated in another unit). FIGS. 10A and 10B are aberration diagrams at the wide-angle end (close to a short-distance focal point) and the telephoto end (close to a long-distance focal point) when an object distance (a distance from the first lens group to an object) of 2.1 m.

TABLE 9

EMBODIMENT 5
f = 23.4–34.4 Fno = 1.85–2.30

| | Ri | di | Ni | vi |
|---|---|---|---|---|
| 1 | 41.69873 | 2.6000 | 1.80518 | 25.4 |
| 2 | 20.72632 | 7.3389 | | |
| 3* | 43.3722 | 3.3000 | 1.52996 | 55.8 |
| 4* | 23.93318 | 11.2533 | | |
| 5 | −25.69109 | 1.8983 | 1.48749 | 70.2 |
| 6 | −268.94696 | 1.5000 | | |
| 7 | −202.20306 | 5.0000 | 1.83400 | 37.2 |
| 8 | −46.3916 | (d8) | | |
| 9 | 82.55475 | −4.0157 | 1.83400 | 37.2 |
| 10 | −1.5000E+09 | (d10) | | |
| 11 | 56.7807 | 4.8519 | 1.64769 | 33.8 |
| 12 | −825.1516 | (d12) | | |
| 13 | (APERTURE) | −1.8206 | | |
| 14 | −34.17057 | 1.5000 | 1.75520 | 27.5 |

TABLE 9-continued

EMBODIMENT 5
f = 23.4–34.4 Fno = 1.85–2.30

| | Ri | di | Ni | vi |
|---|---|---|---|---|
| 15 | −175.55047 | 5.5439 | | |
| 16 | −100.03237 | 1.7000 | 1.83400 | 37.2 |
| 17 | 37.6337 | 5.9000 | 1.48749 | 70.2 |
| 18 | −75.91589 | 0.6300 | | |
| 19 | 65.02211 | 7.9998 | 1.48749 | 70.2 |
| 20 | −38.56084 | 0.6135 | | |
| *21 | −94.5781 | 4.1500 | 1.52996 | 55.8 |
| *22 | −51.82303 | (d22) | | |
| 23 | 56.4896 | −5.8646 | 1.48749 | 70.2 |
| 24 | −226.3227 | 1.4500 | | |
| 25 | ∞ | 64.0000 | 1.84666 | 23.8 |
| 26 | ∞ | 3.8000 | 1.51633 | 64.1 |
| 27 | ∞ | 5.8000 | | |

TABLE 10

ASPHERIC DATA

| | 1/r | κ | A | B | C | D | E |
|---|---|---|---|---|---|---|---|
| *3 | 0.02306 | −0.86529 | −1.98616E−05 | 1.04606E−07 | −4.13759E−10 | 1.12382E−12 | −1.35302E−15 |
| *4 | 0.04178 | −4.32910 | −1.46656E−06 | 2.96844E−08 | −3.14350E−10 | 1.09785E−12 | −1.73923E−15 |
| *21 | −0.01057 | −65.86607 | −1.32936E−05 | 3.77040E−08 | −1.13310E−10 | 3.75335E−13 | −3.73470E−16 |
| *22 | −0.01930 | −7.91329 | −8.43109E−06 | 1.51489E−08 | −3.51631E−11 | 1.84823E−13 | −1.61827E−16 |

GAP DATA

| | d8 | d10 | d12 | d22 |
|---|---|---|---|---|
| Wide | 9.1893 | 28.0476 | 26.3825 | 0.9000 |
| Tele | 0.5000 | 1.0000 | 30.9454 | 32.0740 |

The first lens group L1 has a four-lens configuration including, in order from the front to rear sides thereof, the meniscus negative lens G11 having a convex front surface, the meniscus negative lens G12 having a convex front surface, the negative lens G13 having a concave front surface, and the positive lens G14 having a convex rear surface.

The negative lens G12 is made as a plastic lens and both surfaces thereof are aspherical. Since both surfaces are aspherical, the plastic lens G12 compensates for mainly a distortion aberration. Also, since the rear surface of the rearmost positive lens G14 is convex, the positive lens G14 compensates for the distortion aberration and an astigmatism. In addition, by incorporating both high and low dispersion glass lenses in the first lens group L1, a chromatic aberration of magnification is inhibited from generation as little as possible.

The second lens group L2 has a single lens configuration of a positive lens G21 having convex lens surfaces on its both sides and compensates for mainly various aberrations generated in the first lens group L1. The positive lens G21 is composed of a material having a high refractive index so as to compensate for the Petzval sum and minimize variations in various aberrations including a spherical aberration at the time of zooming (magnification of varying).

In general, when a curvature of field and the astigmatism are great, for example, at the height of an intermediate image, resolution sensation deteriorates. Hence, it is important to compensate for the Petzval sum so as to be minimized. In addition, from the viewpoint of compensating for the chromatic aberration, in order to effectively compensating for the chromatic aberration of magnification generated in the first lens group L1, a material having a high refractive index and a low dispersion property is selected for the second lens group L2.

The third lens group L3 is configured by the positive lens G31 having convex lens surfaces on its both sides and serves as a main lens group for performing magnification of varying.

The fourth lens group L4 has a five-lens configuration including, in order from the front to rear sides thereof, the meniscus negative lens G41 having a convex rear surface, a negative lens G42 having concave lens surfaces on its both sides, a positive lens G43 having convex lens surfaces on its both sides, these two configuring a cemented lens, a positive lens G44 having convex lens surfaces on its both sides, and a meniscus positive lens G45 having a convex rear surface.

With the arrangement of the negative lens G41 having negative refractive power on the foremost side, the Petzval sum is effectively minimized. Controlling the position of the rear principal point allows a back focus to have a necessary length while achieving satisfactory telecentricity.

In order to minimize the chromatic aberration, a low dispersion glass is employed in the cemented lens and the independent positive lens G44. The rearmost lens G45 is composed of a plastic and both lens surfaces thereof are aspherical, thereby effectively compensating for an off-axis aberration such as the astigmatism.

The aperture ST is present in the fourth lens group L4 and inhibits a variation in the off-axis aberration at the time of zooming. The aperture ST may be set somewhere other than in the fourth lens group L4.

Upon zooming, the aperture ST may be formed so as to move independently without moving together with the lens groups.

The fifth lens group L5 is configured by the positive lens G51 having convex lens surfaces on its both sides. While being composed of a low dispersion glass in order to inhibit the chromatic aberration, the positive lens G51 has stronger power so as to improve telecentricity.

While the two aspherical plastic lenses respectively have positive and negative refractive power in the present embodiment, in addition to this configuration, a plurality of plastic lenses may be employed.

The material of the aspherical lens is not limited to a plastic material and may be a glass material. Alternatively, the aspherical lens may have a so-called hybrid aspherical structure in which its optical surface has a thin resin layer formed thereon so as to offer an aspherical shape.

According to the present embodiment, a projection lens capable of offering a high magnification of varying, i.e., a zooming magnification of about 1.5 is achieved, while having features in which its F-number is as small as 1.85 and its 100-model is projectable at a short range of about 3.2 m.

Figure 11:
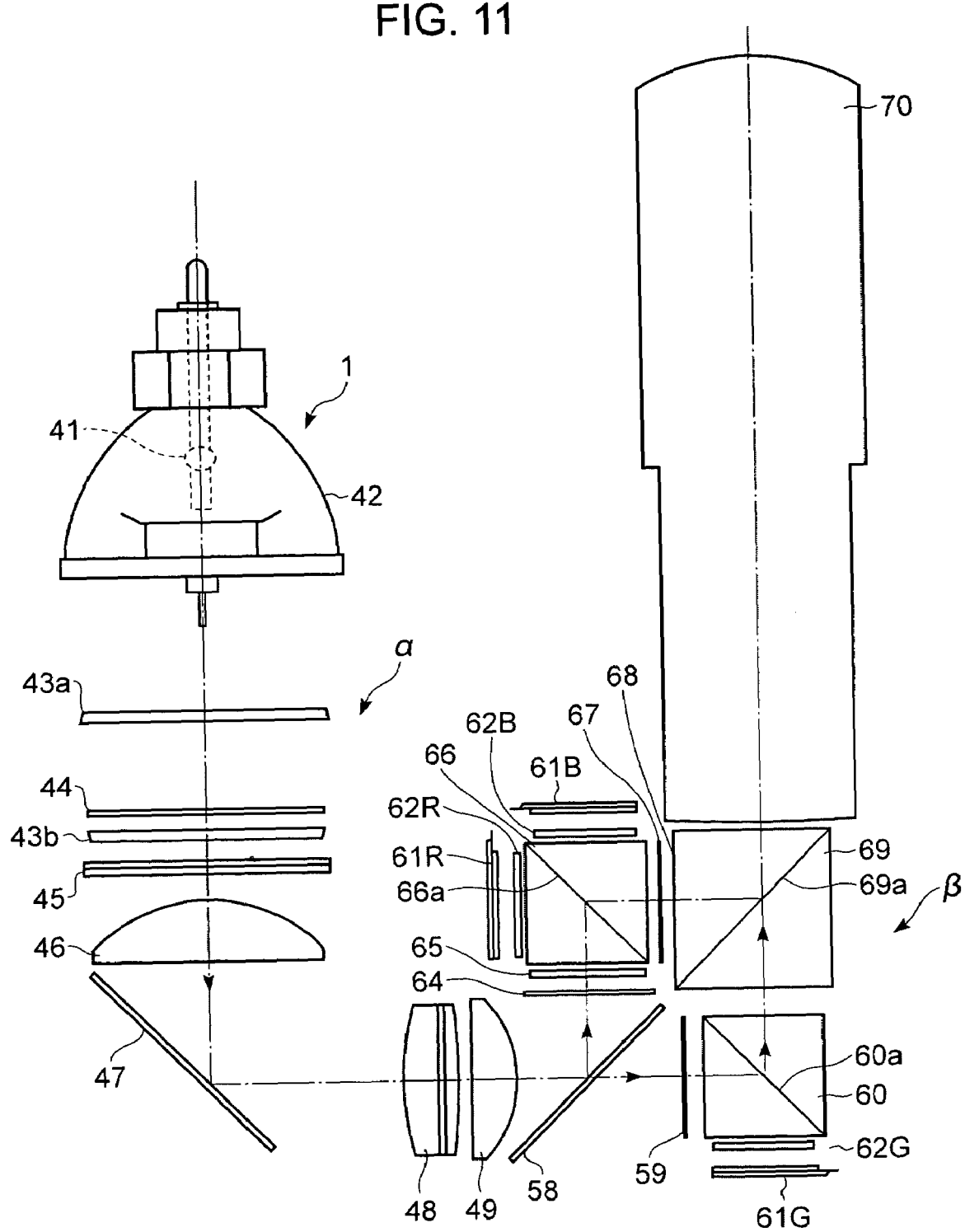
FIG. 11 illustrates an optical system of a projection-type image displaying apparatus according to another embodiment of the present invention.

Referring now to FIG. 11, a projection-type image-displaying apparatus including the projection lens (the projection optical system) according to any one of the foregoing Embodiments 1 to 5 will be described. Here, the optical configuration of the projection-type image-displaying apparatus having a reflective liquid-crystal display (an image display device such as a reflective liquid crystal panel; as a matter of course, a projection-type liquid crystal panel can be applied) installed therein, including a lamp 1, an illumination optical system α, a color separation-synthesis optical system β, and a projection lens optical system 70 accommodated in a projection lens barrel (not shown) will be described with reference to FIG. 11.

As shown in FIG. 11, the lamp 1 includes a light emission tube 41 emitting white light in a form of a continuous spectrum and a reflector 42 condensing light from the light emission tube 41 in a predetermined direction. These two members constitute the lamp 1.

The projection-type image-displaying apparatus includes a first cylinder array 43a configured by a lens array having a plurality of cylindrical lens arrayed therein, each lens having refractive power in an orthogonal direction (in a direction orthogonal to the traveling direction of light emitted from the lamp 1 (in a direction perpendicular to the plane of the figure)); a second cylinder array 43b configured by another lens array including cylindrical lenses corresponding to the respective cylindrical lenses of the first cylinder array 43a; an ultraviolet absorbing filter 44; and a polarization sensing element 45 aligning non-polarized light into predetermined polarized light.

The projection-type image-displaying apparatus also includes a front compressor 46 configured by a cylindrical lens having refractive power in the horizontal directions (parallel to the plane of the figure); a mirror 47 converting an optical axis by 90 degrees; a condenser lens 48; a rear compressor 49 configured by a cylindrical lens having refractive power in the horizontal directions.

The above-described components constitute the illumination optical system α.

The projection-type image-displaying apparatus further includes a dichroic mirror 58 reflecting light in the wavelength regions of a blue color (B) and a red color (R) thereat and allowing light in the wavelength region of a green color (G) to pass therethrough; a G-use incident-side polarizing plate 59 formed by bonding a polarizer to a transparent substrate and allowing only S-polarized light to pass therethrough; and a first polarized-beam splitter 60 which allows P-polarized light to pass therethrough and reflects S-polarized light thereat and which has a polarization & separation surface 60a.

The projection-type image-displaying apparatus further includes a red (R)-light-use reflective liquid-crystal display 61R, a green (G)-light-use reflective liquid-crystal display 61G, and a blue (B)-light-use reflective liquid-crystal display 61B, each composed of twisted nematic (TN) liquid crystal, reflecting incident light thereat and performing image modulation.

The projection-type image-displaying apparatus further includes a red-use quarter wave plate 62R, a green-use quarter wave plate 62G, a blue-use quarter wave plate 62B; an R & B-use incident-side polarizing plate 64 formed by bonding a polarizer to a transparent substrate and allowing only S-polarized light to pass therethrough; a first color-selective retardation film 65 changing the polarizing direction of the B-light by 90 degrees without changing the polarizing direction of the R-light; a second polarized-beam splitter 66 which allows P-polarized light to pass therethrough and reflects S-polarized light thereat and which has a polarization-separation surface 66a.

The projection-type image-displaying apparatus further includes a second color-selective retardation film 67 changing the polarizing direction of the R-light by 90 degrees without changing the polarizing direction of B-light.

The projection-type image-displaying apparatus further includes an R & B-use emitting-side polarizing plate (a polarizer) 68 allowing S-polarized light to pass therethrough; and a third polarized-beam splitter 69 (a color-synthesizing mechanism) which allows P-polarized light to pass therethrough and reflects S-polarized light thereat and which has a polarization-separation surface 69a.

The above-described members from the dichroic mirror 58 to the third polarized-beam splitter 69 constitute the color separation-synthesis optical system β.

The illumination optical system α, the color separation-synthesis optical system β, and the projection lens optical system 70 constitute an image-displaying optical system.

An optical operation of the projection-type image-displaying apparatus will be described.

Light emitted from the light emission tube 41 is condensed by the reflector 42 in a predetermined direction. Since the reflective surface of the reflector 42 is parabolic, light emitted from the focal position of the parabolic surface travels parallel to the symmetrical axis (the optical axis) of the parabolic surface. Since light fluxes from the light emission tube 41 are not fluxes emitted from an ideal light source but those from the light-emitting unit having a finite size, many of the condensing light fluxes do not travel parallel to the symmetrical axis of the parabolic surface.

The light fluxes are incident on the first cylinder array 43a. The light fluxes incident on the first cylinder array 43a are separated and condensed into a plurality of light fluxes (a plurality of belt-shaped light fluxes in the horizontal direction) corresponding to the respective cylinder lenses. The plurality of light fluxes (the plurality of belt-shaped light fluxes in the horizontal direction) passes through the second cylinder array 43b and then the ultraviolet absorbing filter 44 and is formed in the vicinity of the polarization sensing element 45.

The polarization-sensing element 45 includes pluralities of polarization-separation surfaces, reflective surfaces, and half wave plates, arrayed in the vertical direction. The plurality of light fluxes are incident on the polarization-separation surfaces corresponding to the respective arrays and separated into a P-polarized component passing therethrough and an S-polarized component reflected thereat.

The light of the reflected S-polarized component is reflected at the reflective surface and emitted into the same direction as the P-polarized component. Whereas, the light of the transmitted P-polarized component passes through the half wave plate, is converted into a polarized component the same as the S-polarized component, and emitted as light fluxes whose polarized directions are aligned. After emitted from the polarization sensing element 45, the plurality of polarized light fluxes (the plurality of belt-shaped light fluxes in the horizontal direction) passes through the front compressor 46, is reflected at the reflective mirror 47 by 90 degrees, and reaches the condenser lens 48 and the rear compressor 49.

Optical operations of the front compressor 46, the condenser lens 48, and the rear compressor 49 are appropriately set. The plurality of light fluxes thus has a shape of rectangular images being overlaid one another, thereby forming a rectangular and uniform illumination area.

The reflective liquid-crystal displays 61R, 61G, and 61B are arranged in the illumination area, which will be described later. The S-polarized light polarized by the polarization-sensing element 45 is incident on the dichroic mirror 58. The dichroic mirror 58 reflects B-light (having a wavelength in the range from 430 to 495 nm) and R-light (having a wavelength in the range from 590 to 650 nm) thereat and allows G-light (having a wavelength in the range from 505 to 580 nm) to pass therethrough.

Subsequently, an optical path of the G-light will be described.

The G-light passing through the dichroic mirror 58 is incident on the incident-side polarizing plate 59. The G-light remains as S-polarized light after separated by the dichroic mirror 58. After emitted from the incident-side polarizing plate 59, the G-light is incident on the first polarized beam splitter 60 so as to serve as S-polarized light, reflected at its polarization-separation surface 60a, and reaches the G-light use reflective liquid-crystal display 61G. The G-light is subjected to image modulation in the G-light use reflective liquid-crystal display 61G and reflected at the same. An S-polarized component of the reflected G-light subjected to the image modulation is reflected again at the polarization-separation surface 60a of the first polarized beam splitter 60, returns to the light source 1, and removed from the projected light.

Whereas, a P-polarized component of the reflected G-light subjected to the image modulation passes through the polarization-separation surface 60a of the first polarized beam splitter 60 and travels towards the third polarized-beam splitter 69 so as to serve as projection light.

On this occasion, in a state in which all polarized components are converted into S-polarized light (in a state of displaying black), by adjusting the phase retard axis of the quarter wave plate 62G provided between the first polarized beam splitter 60 and the G-light use reflective liquid-crystal display 61G in a predetermined direction, an influence of a disturbance of the polarized state generated in the first polarized beam splitter 60 and the G-light use reflective liquid-crystal display 61G can be minimized.

The G-light emitted from the first polarized beam splitter 60 is incident on the third polarized-beam splitter 69 so as to serve as P-polarized light, passes through the polarization-separation surface 69a of the third polarized-beam splitter 69, and reaches the projection lens system 70.

Whereas, the R-light and B-light reflected at the dichroic mirror 58 are incident on the incident-side polarizing plate 64. The R-light and B-light remain as S-polarized light after separated by the dichroic mirror 58. Then, after emitted from the incident-side polarizing plate 64, the R-light and B-light are incident on the first color-selective retardation film 65. Since the first color-selective retardation film 65 has a function of rotating the polarizing direction of only the B-light by 90 degrees, the B-light and R-light are incident on the second polarized-beam splitter 66 so as to serve respectively as P-polarized light and S-polarized light. The R-light incident on the second polarized-beam splitter 66 so as to serve as the S-polarized light is reflected at the polarization-separation surface 66a of the second polarized-beam splitter 66 and reaches the R-light use reflective liquid-crystal display 61R. The B-light incident on the second polarized-beam splitter 66 so as to serve as the P-polarized light passes through the polarization-separation surface 66a of the second polarized-beam splitter 66 and reaches the B-light use reflective liquid-crystal display 61B.

The R-light incident on the R-light use reflective liquid-crystal display 61R is reflected thereat after being subjected to image modulation therein. An S-polarized component of the reflected R-light subjected to the image modulation is reflected again at the polarization-separation surface 66a of the second polarized-beam splitter 66, returned to the light source 1, and removed from the projected light. Whereas, a P-polarized component of the reflected R-light subjected to the image modulation passes through the polarization-separation surface 66a of the second polarized-beam splitter 66 and travels towards the second color-selective retardation film 67 so as to serve as projection light.

The B-light incident on the B-light use reflective liquid-crystal display 61B is reflected thereat after being subjected to image modulation therein. A P-polarized component of the reflected B-light subjected to the image modulation passes again through the polarization-separation surface 66a of the second polarized-beam splitter 66, is returned to the light source 1, and removed from the projected light.

Whereas, an S-polarized component of the reflected B-light subjected to the image modulation is reflected at the polarization-separation surface 66a of the second polarized-beam splitter 66 and travels towards the second color-selective retardation film 67 so as to serve as projection light.

On this occasion, by adjusting the phase retard axes of the quarter wave plates 62R and 62B provided between the second polarized-beam splitter 66 and the R-light and B-light use reflective liquid-crystal displays 61R and 61B, black display of each of the R-light and B-light can be adjusted in the same fashion as in the case of the G-light.

A single of light flux is synthesized as described above, and the R-light of the R-light and B-light, each emitted from the second polarized-beam splitter 66 and serving as projection light, is converted into an S-polarized component because of rotation of its the polarization direction by 90 degrees with the aid of the second color-selective retardation film 67, analyzed by the emitting-side polarizing plate 68, and incident on the third polarized-beam splitter 69.

The B-light passes through the second color-selective retardation film 67 while remaining as the S-polarized light, is analyzed by the emitting-side polarizing plate 68, and incident on the third polarized-beam splitter 69. Because of analysis of the emitting-side polarizing plate 68, an effective component of the projection light of each of the R-light and B-light, generated upon passing through the second polarized-beam splitter 66, and also through the R-light use and B-light use reflective liquid-crystal displays 61R and 61B, and the quarter wave plates 62R and 62B, respectively.

The projection light of each of the R-light and B-light incident on the third polarized-beam splitter 69 is reflected at the polarization-separation surface 69a of the third polarized-beam splitter 69, synthesized with the G-light passing through the foregoing polarization-separation surface 69a, and reaches the projection lens system 70.

The synthesized projection light of each of the synthesized R-light, G-light, and B-light is projected in a magnified manner onto a projection surface such as a screen by the projection lens system 70.

While the above-described optical paths are established in the case of white display of the reflective liquid-crystal display, optical paths in the case of black display of the reflective liquid-crystal display will be described.

An optical path of the G-light will be first described.

S-polarized light of the G-light passing through the dichroic mirror 58 is incident on the incident-side polarizing plate 59, then on the first polarized beam splitter 60, reflected at the polarization-separation surface 60a, and reaches the G-light use reflective liquid-crystal display 61G. In the meantime, because of black display of the reflective liquid-crystal display 61G, the G-light is reflected at the G-light use reflective liquid-crystal display 61G without undergoing the image modulation.

Accordingly, the G-light still remains as the S-polarized light after reflected at the reflective liquid-crystal display 61G, is again reflected at the polarization-separation surface 60a of the first polarized beam splitter 60, passes through the incident-side polarizing plate 59, is returned to the light source 1, and removed from the projected light.

Subsequently, optical paths of the R-light and B-light will be described.

S-polarized light of each of the R-light and B-light reflected at the dichroic mirror 58 is incident on the incident-side polarizing plate 64. Then, after emitted from the incident-side polarizing plate 64, the R-light and B-light are incident on the first color-selective retardation film 65. Since the first color-selective retardation film 65 has a function of rotating the polarization direction only of the B-light by 90 degrees, the B-light and R-light are incident on the second polarized-beam splitter 66 so as to serve respectively as P-polarized light and S-polarized light.

The R-light incident on the second polarized-beam splitter 66 so as to serve as the S-polarized light is reflected at the polarization-separation surface 66a of the second polarized-beam splitter 66 and reaches the R-light use reflective liquid-crystal display 61R. The B-light incident on the second polarized-beam splitter 66 so as to serve as the P-polarized light passes through the polarization-separation surface 66a of the second polarized-beam splitter 66 and reaches the B-light use reflective liquid-crystal display 61B.

Because of black display of the reflective liquid-crystal display 61R, the R-light incident on the R-light use reflective liquid-crystal display 61R is reflected at the same without undergoing the image modulation. Accordingly, because of still remaining as the S-polarized light after reflected at the R-light use reflective liquid-crystal display 61R, the R-light is again reflected at the polarization-separation surface 66a of the second polarized-beam splitter 66, passes through the incident-side polarizing plate 64, is returned to the light source 1, and removed from the projected light, thereby establishing the black display.

Because of black display of the B-light use reflective liquid-crystal display 61B, the B-light incident on the B-light use reflective liquid-crystal display 61B is reflected at the same without undergoing image modulation. Accordingly, because of still remaining as P-polarized light after reflected at the B-light use reflective liquid-crystal display 61B, the B-light passes again through the polarization-separation surface 66a of the second polarized-beam splitter 66, is converted into S-polarized light by the first color-selective retardation film 65, passes through the incident-side polarizing plate 64, is returned to the light source 1, and removed from the projected light.

The refractive index of a glass material of each of the foregoing first to third polarized-beam splitters should be not smaller than 1.60 and not greater than 1.90 (the refractive index of light having wavelength of 587.56 nm) from the viewpoint of its feature. The projection lens (the zoom lens) according to any one of the foregoing Embodiments 1 to 5 can be applied to a projection-type image-displaying apparatus (especially, a reflective liquid-crystal displaying apparatus including a reflective liquid-crystal panel) having a structure in which color synthesis (synthesis of optical paths of light in mutually different wavelength ranges) is performed by such a polarized-beam splitter (an optical device having a property of reflecting a component in a predetermined polarizing direction, of light at least in a predetermined wavelength region, desirably in the wavelength regions corresponding to red, green and blue colors is reflected thereat and allowing another component in a polarizing direction orthogonal to the foregoing polarizing direction to pass therethrough).

As described above, the optical configuration of the projection-type image-displaying apparatus including the reflective liquid-crystal display (the reflective liquid-crystal panel) is established.

In place of the reflective liquid-crystal display, a transmissive liquid-crystal display offers the same effect as the reflective one does.

Figure 12:
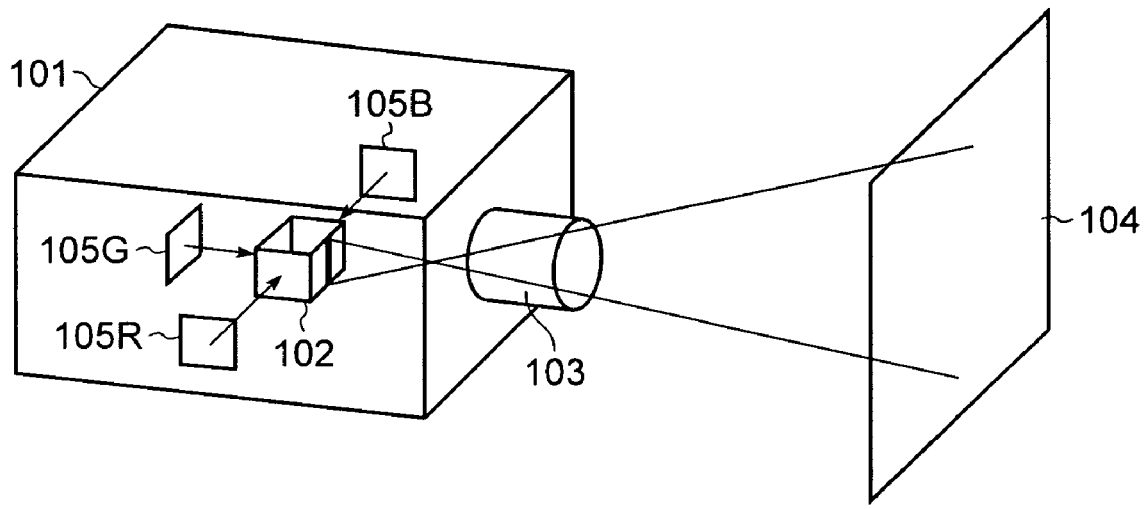
FIG. 12 is a schematic view of a major part of a color liquid crystal projector.

FIG. 12 is a schematic view of a major part of an image projection apparatus according to another embodiment of the present invention.

The figure illustrates the image projection apparatus having a structure in which the foregoing zoom lens is applied to a three-panel color liquid-crystal projector, and image data of a plurality of color light on the basis of a plurality of liquid crystal displays is synthesized by a color-synthesizing mechanism and projected onto a screen surface in a magnified manner by the projection lens.

As shown in FIG. 12, a color liquid-crystal projector 101 synthesizes three kinds of color light corresponding to the R, G, and B colors, emitted from three liquid crystal panels 105R, 105G, and 105B also corresponding to the R, G, and B colors into a single optical path with the aid of a prism 102 serving as a color synthesizing mechanism, and projects it onto a screen 104 with the aid of a projection lens 103 configured by the foregoing zoom lens.

Figure 13:
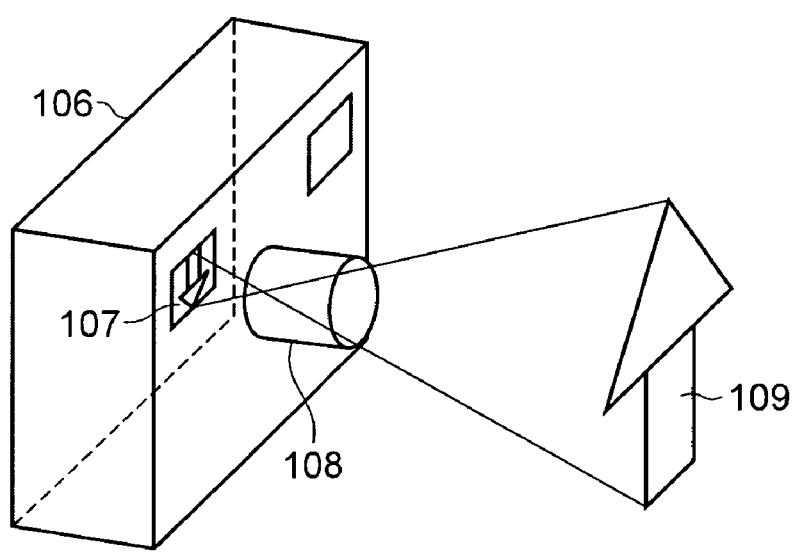
FIG. 13 is a schematic view of a major part of an image pick-up device.

FIG. 13 is a schematic view of a major part of an image pick-up device according to another embodiment of the present invention. In the present embodiment, the foregoing zoom lens is applied to an image pick-up device such as a video camera, a film camera, or a digital camera so as to serve as an imaging lens by way of example.

The image pick-up device shown in FIG. 13 obtains image data by forming an image of an object 109 on a photoreceptor 107 with the aid of an imaging lens 108.

According to each of the above-described embodiments, a zoom lens which has satisfactory optical properties across the overall screen by satisfactorily compensating for various aberrations generated in accordance with zooming, while miniaturizing the overall lens system and which is suitable for use in a liquid crystal projector and so forth is achieved.

In addition, a zoom lens suitable for an image pick-up device such as a video camera, a film camera, or a digital camera, for forming image data on a silver film, or a solid-state image pickup device (a photoelectric conversion device) such as a CCD sensor or a CMOS sensor is achieved.

Numerical Examples 1 to 5 corresponding to the respective zoom lenses according to Embodiments 1 to 5 will be described. In each of Numerical Examples, an order of an optical surface from the magnification side (from the front side) is denoted by i, a radius of curvature of the i-th optical surface (the i-th surface) is denoted by ri, and a gap between the i-th surface and the (i+1)-th surface is denoted by di. Also, a refractive index and an Abbe constant of a material of the i-th optical member are respectively denoted by ni and vi, relative those at d-line. In addition, a focal distance is denoted by f, an F-number is denoted by Fno, and a half angle of view is denoted by ω.

The three rearmost surfaces of each of Numerical Examples 1 to 5 constitute three surfaces of the glass block GB.

When k denotes a conical constant, A, B, C, D, and E denote aspherical coefficients, and, relative to a vertex of the i-th aspherical optical surface (or an intersection made by the i-th optical surface and the optical axis of the optical system), x denotes a displacement in a direction parallel to the optical axis of the zoom lens at the height h from the optical axis, an aspherical shape is expressed as below:

$$x = (h^2/r)/[1 + \{1 - (1+k) \times (h/r)^2\}] + Ah^4 + Bh^6 + Ch^8 + Dh^{10} + Eh^{12},$$

wherein r is a curvature of radius.

In the above equation, for example, an expression "(E-xx)" means "$10^{-xx}$".

The relationship between each of the foregoing conditional expressions 1 to 9 and a variety of numerical values of Numerical Examples 1 to 5 are shown in Table 11.

TABLE 11

VALUE OF EACH CONDITIONAL EXPRESSION (Table 1)

| | EMBODIMENT 1 | EMBODIMENT 2 | EMBODIMENT 3 | EMBODIMENT 4 | EMBODIMENT 5 |
|---|---|---|---|---|---|
| (1) | 25.4 | 23.8 | 23.8 | 23.8 | 25.4 |
| (2) | 0.0153 | 0.0163 | 0.0163 | 0.0163 | 0.0153 |
| (3) | 0.66 | 0.53 | 0.59 | 0.51 | 0.77 |
| (4) | 70.2 | 81.6 | 70.2 | 70.2 | 70.2 |
| (5) | 0.0043 | 0.0317 | 0.0043 | 0.0043 | 0.0043 |
| (6) | 24.6 | 24.6 | 24.6 | 24.6 | 24.6 |
| (7) | 0.0099 | 0.0099 | 0.0099 | 0.0099 | 0.0099 |
| (8) | 65.4 | 65.4 | 65.4 | 62.2 | — |
| (9) | — | — | — | — | 65.4 |

EMBODIMENT 1

| GLASS USED | CONDITIONAL EXPRESSIONS (1), (2) S-TIH6 (MADE BY OHARA) | CONDITIONAL EXPRESSIONS (4), (5) S-FSL5 (MADE BY OHARA) | CONDITIONAL EXPRESSIONS (6), (7) SF57HHT (MADE BY SCHOTT) |
|---|---|---|---|
| nd | 1.80518 | 1.48749 | 1.84666 |
| ng | 1.84729 | 1.49596 | 1.89393 |
| nF | 1.82777 | 1.49228 | 1.87204 |
| nC | 1.79611 | 1.48534 | 1.83650 |

EMBODIMENT 2

| GLASS USED | CONDITIONAL EXPRESSIONS (1), (2) S-TIH53 (MADE BY OHARA) | CONDITIONAL EXPRESSIONS (6), (7) S-FPL51 (MADE BY OHARA) | CONDITIONAL EXPRESSIONS (4), (5) SF57HHT (MADE BY SCHOTT) |
|---|---|---|---|
| nd | 1.84666 | 1.49700 | 1.84666 |
| ng | 1.89419 | 1.50451 | 1.89393 |
| nF | 1.87210 | 1.50123 | 1.87204 |
| nC | 1.83649 | 1.49514 | 1.83650 |

EMBODIMENT 3

| GLASS USED | CONDITIONAL EXPRESSIONS (1), (2) S-TIH53 (MADE BY OHARA) | CONDITIONAL EXPRESSIONS (6), (7) S-FSL5 (MADE BY OHARA) | CONDITIONAL EXPRESSIONS (4), (5) SF57HHT (MADE BY SCHOTT) |
|---|---|---|---|
| nd | 1.84666 | 1.48749 | 1.84666 |
| ng | 1.89419 | 1.49596 | 1.89393 |
| nF | 1.87210 | 1.49228 | 1.87204 |
| nC | 1.83649 | 1.48534 | 1.83650 |

In addition, the relationships between glass materials used in the respective Embodiments and the conditional expressions (1), (2), and (4) to (7) are shown in Table 12.

TABLE 12

| GLASS USED | CONDITIONAL EXPRESSIONS (6), (7) S-FSL5 (MADE BY OHARA) | CONDITIONAL EXPRESSIONS (4), (5) SF57HHT (MADE BY SCHOTT) |
|---|---|---|
| EMBODIMENT 4 | | |
| CONDITIONAL EXPRESSIONS (1), (2) S-TIH53 (MADE BY OHARA) | | |
| nd | 1.84666 | 1.48749 | 1.84666 |
| ng | 1.89419 | 1.49596 | 1.89393 |
| nF | 1.87210 | 1.49228 | 1.87204 |
| nC | 1.83649 | 1.48534 | 1.83650 |
| EMBODIMENT 5 | | |
| CONDITIONAL EXPRESSIONS (1), (2) S-TIH6 (MADE BY OHARA) | | |
| nd | 1.80518 | 1.48749 | 1.84666 |
| ng | 1.84729 | 1.49596 | 1.89393 |
| nF | 1.82777 | 1.49228 | 1.87204 |
| nC | 1.79611 | 1.48534 | 1.83650 |

According to the above-described embodiments, a zoom lens having satisfactory optical properties across the overall screen by satisfactorily compensating for various aberrations generated in accordance with zooming, while miniaturizing the overall lens system is achieved.

In addition, according to the above-described embodiments, a zoom lens having optical properties of a large aperture, a wide angle of view, and a large magnification of varying, satisfactorily compensating for various aberrations while having a long back focus, and having telecentricity is achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-271577 filed Sep. 17, 2004, which is hereby incorporated by reference herein in its entirety.

What is claimed is:

1. A zoom lens comprising:
a plurality of lens groups including a first lens group arranged on the foremost side and having negative optical power,
wherein zooming is performed by moving at least one of the plurality of lens groups along a direction parallel to an optical axis of the zoom lens,
wherein the first lens group is fixed during the zooming,
wherein a first lens arranged on the foremost side, of the first lens group has negative refractive power, and
wherein, when an Abbe constant and a partial dispersion of a material configuring the first lens are respectively represented by $\nu dn$ and $\theta g, Fn$, a focal distance of the first lens group is represented by f1, and an air-equivalent back focus upon focusing on an infinity object is represented by bf, the following conditions are satisfied:

$\nu dn < 32$, $0.008 < \theta g, Fn - (0.644 - 0.00168 \times \nu dn) < 0.040$, and $|f1/bf| < 0.9$.

2. The zoom lens according to claim 1, wherein a positive lens is arranged on the rearmost side, and, when an Abbe constant and a partial dispersion of a material configuring the positive lens are respectively represented by $\nu dp$ and $\theta g, Fp$, the following conditions are satisfied:

$\nu dp > 63$, and $-0.005 < \theta g, Fp - (0.644 - 0.00168 \times \nu dp) < 0.045$.

3. The zoom lens according to claim 1, wherein at least one prism is arranged between a rearmost lens and an image plane, and, when an Abbe constant and a partial dispersion of a material configuring the prism are respectively represented by $\nu dpr$ and $\theta g, Fr$, the following conditions are satisfied:

$\nu dpr < 50$, and $0.002 < \theta g, Fr - (0.644 - 0.00168 \times \nu dpr) < 0.040$.

4. The zoom lens according to claim 1, wherein, in order from the front to rear sides thereof, the plurality of lens groups includes the first lens group having negative refractive power, a second lens group having positive refractive power, a third lens group having positive refractive power, a fourth lens group having negative refractive power, a fifth lens group having positive refractive power, and a sixth lens group having positive refractive power, and
wherein, upon zooming, the first and sixth lens groups are fixed and the second through fifth lens groups are movable.

5. The zoom lens according to claim 4, wherein the fifth lens group includes at least one plastic positive lens having an aspherical surface.

6. The zoom lens according to claim 4, wherein the fifth lens group includes at least one plastic negative lens having an aspherical surface.

7. The zoom lens according to claim 4, wherein the fifth lens group includes at least one positive lens, and, when the average Abbe constant of a material configuring said at least one positive lens is represented by $\nu 5p$, the following condition is satisfied:

$\nu 5p > 60$.

8. The zoom lens according to claim 4, wherein the fourth lens group includes an aperture and at least one meniscus negative lens having a convex rear surface.

9. The zoom lens according to claim 1, wherein, in order from the front to rear sides thereof, the plurality of lens groups includes the first lens group having negative refractive power, a second lens group having positive refractive power, a third lens group having positive refractive power, a fourth lens group having positive refractive power, and a fifth lens group having positive refractive power, and
wherein, upon zooming, the first and fifth lens groups are fixed and the second through fourth lens groups are movable.

10. The zoom lens according to claim 9, wherein the fourth lens group includes at least one plastic positive lens having an aspherical surface.

11. The zoom lens according to claim 9, wherein the first lens group includes at least one plastic negative lens having an aspherical surface.

12. The zoom lens according to claim 9, wherein the fourth lens group includes at least one positive lens, and, when the average Abbe constant of a material configuring said at least one positive lens is represented by ν4$p$, the following condition is satisfied:

ν4$p$>60.

13. The zoom lens according to claim 9, wherein the fourth lens group includes an aperture and a meniscus negative lens on the foremost side, having a convex rear surface.

14. A zoom lens, comprising:
a plurality of lens groups including a first lens group arranged on the foremost side, having negative optical power,
wherein zooming is performed by moving at least one of the plurality of lens groups along a direction parallel to an optical axis of the zoom lens,
wherein a rearmost lens group of the plurality of lens groups is fixed during the zooming,
wherein a first lens arranged on the foremost side, of the first lens group has negative refractive power, and
wherein, when an Abbe constant and a partial dispersion of a material configuring the first lens are respectively represented by νdn and θg,Fn; a focal distance of the first lens group is represented by f1; and an air-equivalent back focus upon focusing on an infinity object is represented by bf, the following conditions are satisfied:

νdn<32, 0.008<θg,Fn−(0.644−0.00168×ν$dn$)<0.040, and

|f1/bf|<0.9.

15. A zoom lens, comprising:
five or six lens groups including a first lens group arranged on the foremost side and having negative refractive power,
wherein, upon zooming, the first lens group and a rearmost lens group are fixed and a plurality of the lens groups is movable,
wherein negative and positive lenses Ln and Lp are respectively arranged on the foremost side and closest to an image, and
wherein, when an Abbe constant and a partial dispersion of a material configuring the negative lens Ln are respectively represented by νdn and θg,Fn and an Abbe constant and a partial dispersion of a material configuring the positive lens Lp are respectively represented by νdp and θg,Fp, and when a focal distance of the first lens group is defined f1 and an air-equivalent back focus is represented by bf, the following conditions are satisfied:

νdn<32, 0.008<θg,Fn−(0.644−0.00168×ν$dn$)<0.040,

|f1/bf|<0.9,

νdp>63, and

−0.005<θg,Fp−(0.644−0.00168×ν$dp$)<0.045.

16. An image projection apparatus, comprising:
a display unit forming an original image; and
the zoom lens according to claim 1, projecting the original image formed by the display unit onto a projection screen.

17. An image projection apparatus, comprising:
a display unit forming an original image; and
the zoom lens according to claim 14, projecting the original image formed by the display unit onto a projection screen.

18. An image projection apparatus, comprising:
a display unit forming an original image; and
the zoom lens according to claim 15, projecting the original image formed by the display unit onto a projection screen.

* * * * *